United States Patent
Emmanuel et al.

(10) Patent No.: US 11,184,851 B2
(45) Date of Patent: Nov. 23, 2021

(54) POWER MANAGEMENT TECHNIQUES FOR A POWER SENSITIVE WIRELESS DEVICE

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 15/666,933

(22) Filed: Aug. 2, 2017

(65) Prior Publication Data

US 2018/0020407 A1 Jan. 18, 2018

Related U.S. Application Data

(63) Continuation-in-part of application No. 15/651,466, filed on Jul. 17, 2017, now Pat. No. 10,999,793.
(Continued)

(51) Int. Cl.
*H04W 52/02* (2009.01)
*H04N 5/232* (2006.01)
(Continued)

(52) U.S. Cl.
CPC ......... *H04W 52/0229* (2013.01); *H04L 43/08* (2013.01); *H04N 5/23203* (2013.01);
(Continued)

(58) Field of Classification Search
CPC ..... H04W 52/02; H04W 84/12; H04W 88/08; H04W 8/00; H04W 52/28; H04W 52/00; H04W 28/0221; H04W 40/10; H04W 52/028; H04W 52/0283; H04W 52/0209; H04W 52/0216; H04W 52/0212; H04W 52/0222; H04W 52/0229; H04W 52/0254; H04W 52/0251; H04W 52/0258; H04W 52/0261; H04W 52/0264; H04W 52/0274;
(Continued)

(56) References Cited

U.S. PATENT DOCUMENTS 7,689,998 B1 * 3/2010 Chrysanthakopoulos ..................
G06F 9/4881
718/104
8,248,948 B2 8/2012 Weil et al.
(Continued)

*Primary Examiner* — Jeffrey M Rutkowski
*Assistant Examiner* — Sudesh M Patidar
(74) *Attorney, Agent, or Firm* — Perkins Coie LLP

(57) ABSTRACT

Techniques are disclosed for reducing power consumption on a power sensitive wireless device, such as for example a digital wireless camera operating on a battery. According to some techniques, power can be reduced when a portable device is in close proximity to the power sensitive wireless device, such as when a person is home and the recording of video on a digital wireless security camera can be disarmed. Some techniques include filtering mechanisms, which reduce unnecessary information being transmitted to the wireless network circuit of the power sensitive wireless device. Other techniques include modifying or adapting IEEE 802.11 standards to achieve power reducing results such as for example reducing the number of times to wake up to receive the beacons. Also, improved synchronization techniques are implemented such as for example improved synchronization accuracy allows reducing the duration of the wake time for receiving the beacons.

26 Claims, 18 Drawing Sheets

Related U.S. Application Data

(60) Provisional application No. 62/363,784, filed on Jul. 18, 2016.

(51) Int. Cl.

| | | |
|---|---|---|
| *H04L 12/26* | (2006.01) | |
| *H04W 84/12* | (2009.01) | |
| *H04W 88/08* | (2009.01) | |
| *H04W 8/00* | (2009.01) | |
| *G06N 20/00* | (2019.01) | |

(52) U.S. Cl.
CPC .............. *G06N 20/00* (2019.01); *H04L 43/04* (2013.01); *H04N 5/23241* (2013.01); *H04W 8/005* (2013.01); *H04W 52/0212* (2013.01); *H04W 84/12* (2013.01); *H04W 88/08* (2013.01); *Y02D 30/70* (2020.08)

(58) Field of Classification Search
CPC ........ H04W 4/80; H04W 8/005; H04N 5/232; H04N 21/4436; H04N 5/232411; H04N 1/00891; H04N 1/00896; H04N 5/23241; H04N 5/23203; H04L 12/26; H04L 43/04; H04L 1/0044; H04L 1/0053; H04L 43/08; H04Q 3/54541; H04Q 3/5455; G06N 99/00; G06N 20/00; H04M 1/73; H04B 1/1615; H04B 7/0693; H04B 7/877; H04B 7/0602; H04B 1/04; H04B 2001/3861; H04B 2001/3855; H04B 1/3883; Y02D 30/70
USPC ........................................................ 370/311
See application file for complete search history.

(56) References Cited

U.S. PATENT DOCUMENTS

| | | | |
|---|---|---|---|
| 9,026,254 B2 | 5/2015 | Warren et al. | |
| 2002/0114303 A1* | 8/2002 | Crosbie | H04B 7/269 370/338 |
| 2004/0008630 A1* | 1/2004 | Corson | H04W 36/18 370/241 |
| 2005/0239518 A1* | 10/2005 | D'Agostino | G06F 1/3209 455/574 |
| 2006/0062200 A1* | 3/2006 | Wang | H04L 12/1836 370/352 |
| 2006/0251109 A1* | 11/2006 | Muller | H04L 45/745 370/463 |
| 2007/0206528 A1 | 9/2007 | Walton et al. | |
| 2007/0280453 A1 | 12/2007 | Kelley et al. | |
| 2009/0067369 A1 | 3/2009 | Stamoulis et al. | |
| 2009/0135751 A1* | 5/2009 | Hodges | G06F 1/3209 370/311 |
| 2009/0135794 A1 | 5/2009 | Su et al. | |
| 2009/0221238 A1 | 9/2009 | Ko et al. | |
| 2010/0165897 A1* | 7/2010 | Sood | G06F 1/3209 370/311 |
| 2010/0260146 A1 | 10/2010 | Lu | |
| 2010/0291931 A1 | 11/2010 | Suemitsu et al. | |
| 2011/0150107 A1 | 6/2011 | Jung et al. | |
| 2011/0250926 A1 | 10/2011 | Wietfeldt et al. | |
| 2012/0224484 A1 | 9/2012 | Babiarz et al. | |
| 2012/0225646 A1 | 9/2012 | Mochida et al. | |
| 2013/0198546 A1* | 8/2013 | Fujisawa | G06F 1/3287 713/323 |
| 2013/0329618 A1 | 12/2013 | Panneerselvam et al. | |
| 2014/0003406 A1 | 1/2014 | Kamath et al. | |
| 2014/0204822 A1* | 7/2014 | Park | H04W 68/025 370/311 |
| 2014/0213912 A1 | 7/2014 | Su | |
| 2014/0274203 A1* | 9/2014 | Ganong, III | H04W 52/0261 455/556.1 |
| 2014/0283062 A1* | 9/2014 | Kamthe | H04L 63/1425 726/23 |
| 2015/0092681 A1 | 4/2015 | Fernando et al. | |
| 2015/0098377 A1 | 4/2015 | Amini et al. | |
| 2015/0235542 A1* | 8/2015 | Su | H04W 52/027 340/506 |
| 2015/0323943 A1 | 11/2015 | Chan | |
| 2016/0080652 A1* | 3/2016 | Shirota | H04N 7/183 348/222.1 |
| 2016/0112903 A1* | 4/2016 | Kaushik | H04W 28/0205 370/235 |
| 2016/0183191 A1* | 6/2016 | Badam | H04W 52/0251 370/311 |
| 2016/0227544 A1 | 8/2016 | Katar et al. | |
| 2016/0232778 A1* | 8/2016 | Honjo | G08B 25/001 |
| 2016/0269097 A1 | 9/2016 | Islam et al. | |
| 2017/0006431 A1 | 1/2017 | Donovan et al. | |
| 2017/0034778 A1 | 2/2017 | Brunsman et al. | |
| 2018/0364787 A1 | 12/2018 | Fukumoto | |
| 2018/0373317 A1 | 12/2018 | Ying et al. | |

* cited by examiner ($\Delta t_x$ is the time camera wakes up early because of clock drift)

($\Delta t_2 - \Delta t_1$) → may be used to estimate clock drift

US 11,184,851 B2

POWER MANAGEMENT TECHNIQUES FOR A POWER SENSITIVE WIRELESS DEVICE

CROSS-REFERENCE TO RELATED APPLICATIONS AND EFFECTIVE FILING DATE ENTITLEMENT

This application is a continuation-in-part (CIP) application of U.S. Utility patent application Ser. No. 15/651,466, entitled "POWER MANAGEMENT TECHNIQUES FOR A POWER SENSITIVE WIRELESS DEVICE", filed Jul. 17, 2017, now U.S. Pat. No. 10,999,793, which claims priority to U.S. Provisional Patent Application No. 62/363,784, entitled "POWER MANAGEMENT TECHNIQUES FOR POWER SENSITIVE WIRELESS DEVICE", filed Jul. 18, 2016, which is incorporated herein in its entirety by this reference thereto.

TECHNICAL FIELD

The present disclosure relates generally to electronic communications, and more specifically, to power management techniques for a power sensitive wireless device.

BACKGROUND

With the emerging technologies of wireless networks, sensor technology, and the Internet, there is an ever increasing demand for employing these technologies in such a ways as to achieve inexpensive, convenient, low-maintenance, and reliable products and services for consumers. This is particularly relevant with wireless digital cameras that are equipped with sensors in addition to wireless network circuits and that operate on battery power, such as for example battery-operated home security cameras.

Accordingly, it is desirable to provide methods and apparatuses that reduce the power consumption of the power sensitive wireless devices.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Figure 1:
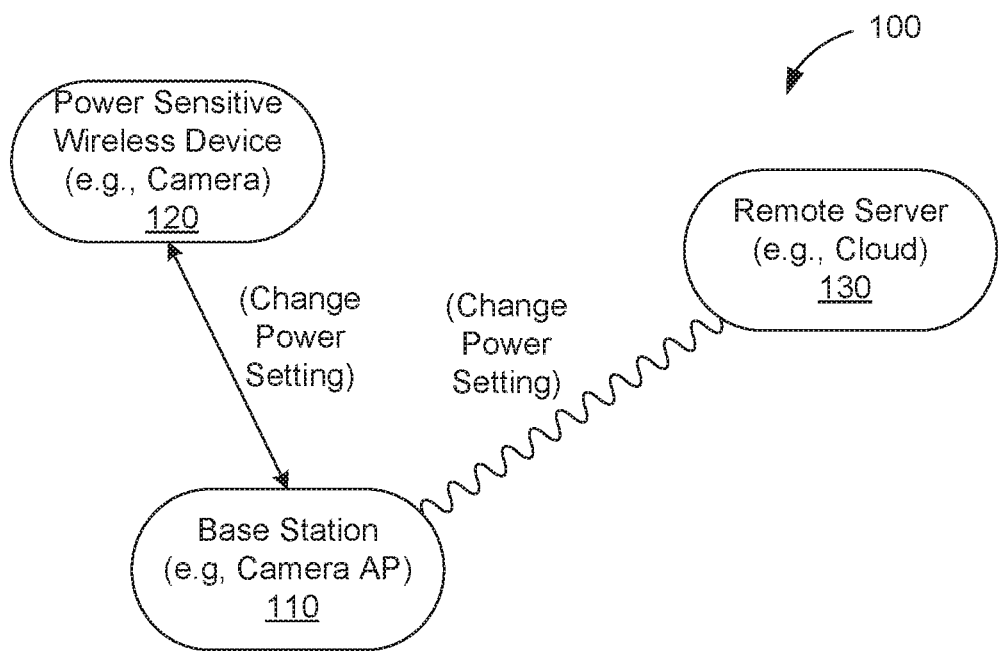
FIG. 1 is a representative computer network environment within which some embodiments may be implemented.

Techniques are disclosed for reducing power consumption on a power sensitive wireless device, such as for example a digital wireless camera operating on a battery and operating in a wireless local area network (WLAN) system. For purposes of understanding herein, a power sensitive wireless device is a wireless device that relies on a power source that has a limited amount of power, such as a battery. According to some techniques, power consumption can be reduced when a portable device is in close proximity to the WLAN system, a user-defined geo-fence, or the power sensitive wireless device. For example, when a person is home, the recording of video on a digital wireless security camera can be disarmed. Some techniques include filtering mechanisms, which reduce unnecessary information being transmitted to the wireless network circuit of the power sensitive wireless device. Other techniques include modifying or adapting IEEE 802.11 standards to achieve power reducing results such as for example reducing the number of times to wake up to receive the beacons. Also, improved synchronization techniques are implemented such as for example improved synchronization accuracy allows reducing the duration of the wake time for receiving the beacons.

Among other benefits, the embodiments disclosed herein can increase battery life and reduce the power consumption of power sensitive wireless device by providing a variety of techniques that can be performed individually or in combination in a way achieves the same or better performance, but without unnecessary power consumption.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure.

The term "coupled" as used herein means connected directly to or connected through one or more intervening components or circuits. Any of the signals provided over various buses described herein may be time-multiplexed with other signals and provided over one or more common buses. In addition, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication (e.g., a network) between components. The present embodiments are not to be construed as limited to specific examples described herein but rather to include within their scope all embodiments defined by the appended claims.

System Overview

FIG. 1 is a representative computer network environment 100 within which some embodiments may be implemented. The environment 100 includes a base station 110, a remote server over a network 130, and a plurality of power sensitive wireless devices 120 ("power sensitive device"), where one such device is shown.

The base station 110, which is illustrated as operating in "access point (AP)" mode for a camera, is coupled together with the remote server 130 such that the base station 110 can enable power sensitive devices 120 to exchange data to and from the remote server 130. In some embodiments, the base station 110 and the remote server 130 may be connected wirelessly (e.g., which may include employing an IEEE 802.11 wireless network, or a data traffic network based on wireless telephony services such as 3G, 3.5G, 4G Long-Term Evolution (LTE) and the like). The technologies supporting the communications between the base station 110 and the remote server 130 may include Ethernet (e.g., as described in IEEE 802.3 family of standards) and/or other suitable types of area network technologies, such as competing or alternative standards to the IEEE 802.11 family of standards (e.g., WiMAX). Examples of different wireless protocols in the IEEE 802.11 family of standards can include IEEE 802.11a, IEEE 802.11b, IEEE 802.11n, IEEE 802.11ac, IEEE 802.11af, IEEE 802.11ah, and IEEE 802.11ad.

Although not shown for simplicity, the base station 110 may include one or more processors, which may be general-purpose processors or may be application-specific integrated circuitry that provides arithmetic and control functions to implement the techniques disclosed herein on the base station 110. The processor(s) may include a cache memory (not shown for simplicity) as well as other memories (e.g., a main memory, and/or non-volatile memory such as a hard-disk drive or solid-state drive). In some examples, cache memory is implemented using SRAM, main memory is implemented using DRAM, and non-volatile memory is implemented using Flash memory or one or more magnetic disk drives. According to some embodiments, the memories may include one or more memory chips or modules, and the processor(s) on the base station 110 may execute a plurality of instructions or program codes that are stored in its memory.

The power sensitive devices 120 can connect to and communicate with the base station 110 wirelessly including, for example, using the IEEE 802.11 family of standards (e.g., Wireless LAN) and/or other suitable types of area network technologies, such as competing or alternative standards to the IEEE 802.11 family of standards (e.g., WiMAX), and can include any suitable intervening wireless network devices including, for example, base stations, routers, gateways, hubs, or the like. Depending on the embodiments, the network technology connecting between the power sensitive devices 120 and the base station 110 can include other suitable wireless standards such as the well-known Bluetooth communication protocols or near field communication (NFC) protocols. In some embodiments, the network technology between the devices 120 and station 110 can include a customized version of WLAN, Bluetooth, or customized versions of other suitable wireless technologies. Power sensitive devices 120 can be any suitable network-connected cameras (or "IP cameras"). It is contemplated that additional examples of the devices 120 equipped with video and audio recording technology can include computing or mobile devices including, for example, smartphones, tablet computers, laptops, personal digital assistants (PDAs), or the like. Additional examples of the devices 120 can include home sensors (e.g., motion detection sensors and temperature sensors) that can connect to the Internet).

It is noted that one of ordinary skill in the art will understand that the components of FIG. 1 are just one implementation of the computer network environment within which present embodiments may be implemented, and the various alternative embodiments are within the scope of the present embodiments. For example, the environment 100 may further include intervening devices (e.g., switches, routers, hubs, etc.) among the base station 110, the remote server 130, and the power sensitive devices 120. In some examples, the network (shown as signal lines) over which the base station 110, the power sensitive devices 120, and the remote server 130 connect comprises the Internet.

Multi-Tier Wake on Wireless Lan

In designs of power sensitive wireless devices, the main processor of the device may be sleeping most of the time and may be woken up using technologies, such as Wake on wireless LAN, which allows the remote wake-up of the device (e.g., such as camera 120) from a standby power state or power save mode for performing device related operations. It has been found that there are a multitude of multicast broadcast packets which arrive at the power sensitive device, yet which should not wake up the main processor. Further, there are many packets which the power sensitive device may need to process but do not require the processing power of the main processor. Thus, there is no need to wake up the main processor for these types of packets. These and other situations are described in detail below.

Figure 2:
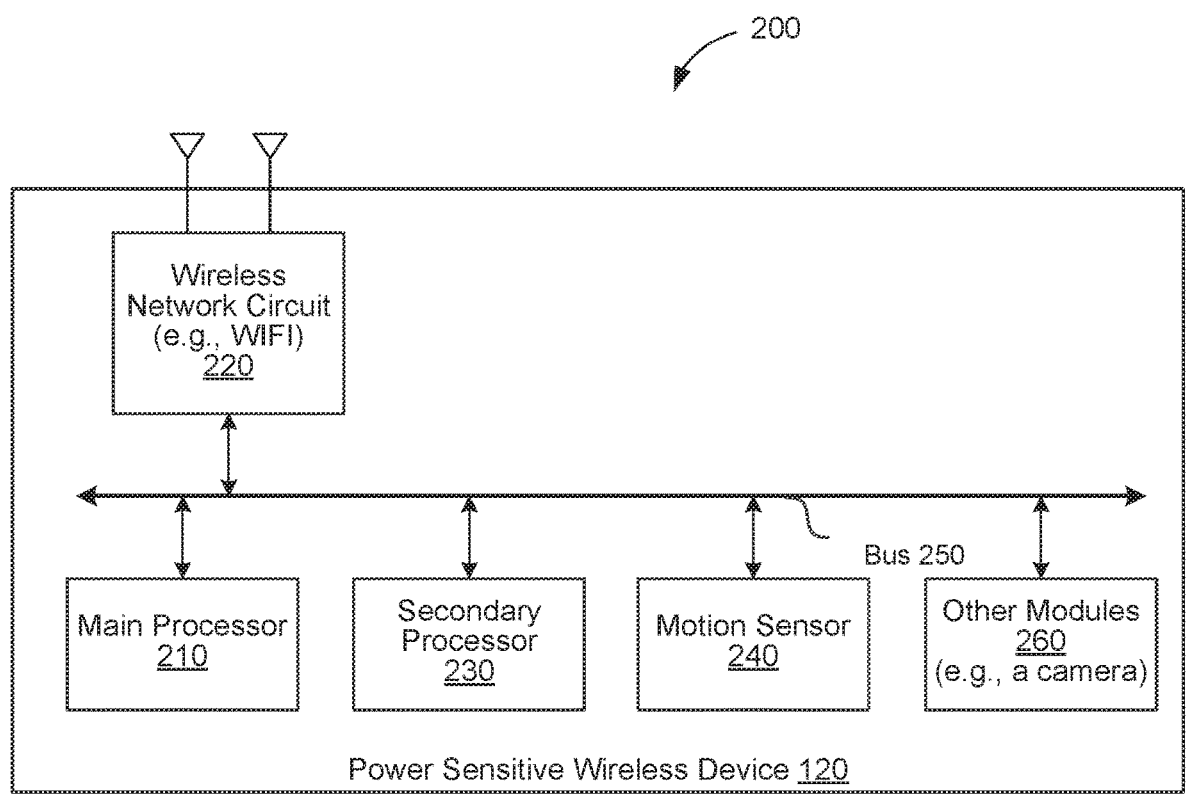
FIG. 2 is a high-level functional block diagram illustrating a power sensitive wireless device equipped with a secondary processor in accordance with some embodiments.

FIG. 2 is a high-level functional block diagram 200 illustrating a power sensitive wireless device equipped with a secondary processor in accordance with some embodiments. As shown in FIG. 2, the power sensitive wireless device includes a main processor 210, a wireless network circuit 220, a secondary processor 230, a motion sensor 240, and other modules 260 (e.g., a camera). In accordance with one or more embodiments, the components are coupled to each other or interface with each other through a bus 250. In some embodiments, the power sensitive device 120 can be configured to function as a client device to the wireless access point (e.g., base station 110) of the WLAN system (e.g., as generally shown in environment 100), and can provide supplemental services to the WLAN system by using hardware modules on the power sensitive device 120. A supplemental service from the power sensitive device is a function that the power sensitive device provides, by using such onboard hardware modules (e.g., the motion sensor 240 or other modules 260), to the wireless access point 110. The supplemental service supplements the access point 110's functionality such that the power sensitive device and the access point 110 can together implement a practical application of the WLAN system, e.g., to provide home security and/or environmental surveillance. In one or more examples, the power sensitive device can be an IP camera (e.g., as implemented by the power sensitive device shown in FIG. 2), and the supplemental service provided to the access point 110 can be a video feed that is captured by the camera module 260 onboard the power sensitive device. In addition, the supplemental service can include the IP camera, equipped with video and audio recording technology, uploading the video and audio data to the wireless access point 110 manually by a user or automatically after the IP camera has been triggered to record. Another example of a supplemental service discussed herein includes motion detection from a motion detection sensor 240. The supplemental service from the power sensitive device in FIG. 2 to the access point 110 can be proximity detection functionality, using the motion sensor 240. In some examples, settings of the motion detection sensor 240 can be manually changed by a user or automatically changed based on predetermined criteria such as detecting that the user is home, as discussed in detail below. It should be noted that while data exchange of the supplemental service is discussed as between the power sensitive device 120 and the wireless access point 110, the supplemental service can include communication between additional devices such as the remote server 130. For example, expanding on the motion detection example, the number of triggering of the motion sensor can get sent from the power sensitive device 120 via the base station 110 for arrival at the remote server 130, as discussed below.

It has been found that access points (APs) commonly forward many multicast and broadcast transmissions originating from different sourced interfaces to the wireless network circuit interface. Many packets of such transmissions do not need to be heard by the power sensitive wireless device, such as power sensitive device 120. For the power sensitive device 120 to process these unnecessary packets consumes much of the power sensitive device's power. For instance, the multicast packets can be the result of the discovery phase of application level protocols. Examples of such protocol include:

Universal Plug and Play;
Bonjour;
Multicast Domain Name System (MDNS); and
Discovery And Launch (DIAL) protocol.

It has been found that most power sensitive devices do not need to hear such packets, e.g., as described above. Also, there can be multicast packets as result of Dynamic Host Configuration Protocol (DHCP) or Address Resolution Protocol (ARP). Indeed, there are some types of packets that do not require the main processor 210 to process. For example, in executing applications on devices such as cameras, cell phones, and personal computers (PCs), the main processor is designed to perform intensive processing at the level of many million instructions per second (MIPS). Thus, it is very inefficient for the main processor 210 to wake up and come out of any power saving state or mode for unnecessary wireless network circuit events. In some embodiments, as will be described in further detail below, such packets can be handled by a processor that is not required to be as powerful the main processor 210. Accordingly, disclosed here are techniques for offloading the handling of such packets in a way that need not wake up a main processor unnecessarily. Such handling and offloading of packets can be predetermined and configured in a certain manner, can be performed in accordance with rules (as described in various embodiments below), and/or, in some instances, in accordance with a trained data model derived from machine learning algorithms (also as described below). The packets which the power sensitive device may not need to hear or process can be different from application to application. Some exemplary packets are as follows:

Periodic 802.11 packets from a keep-alive connection, which is a single connection for sending and receiving HTTP requests/responses instead of opening a new connection for each request/response pair;
Periodic ARP, DHCP, or other TCP/IP packets; and
Periodic status reports for different use cases.

Figure 18:
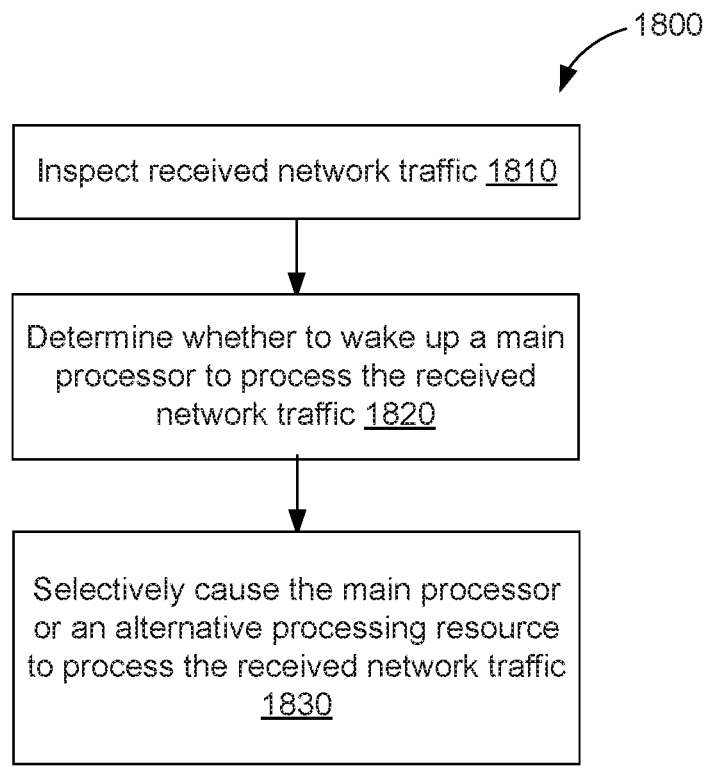
FIG. 18 is an example flowchart illustrating a method for reducing power consumption of a power sensitive wireless device operating in a wireless local area network (WLAN) system, in accordance with some embodiments.

FIG. 18 is an example flowchart 1800 illustrating a method for reducing power consumption of a power sensitive wireless device operating in a wireless local area network (WLAN) system, in accordance with some embodiments. Flowchart 1800 is further explained below in view of the environment and components introduced in FIGS. 1-2.

In some embodiments, to save power at the power sensitive wireless device 120, some of the upper layer stack (e.g., layer 3, layer 4, or application layer), which may have power implications, can be moved to the wireless network circuit 220 or any processor that requires or consumes less power than the main processor 210, as described in further detail below. In some embodiments, a second processor, such as the secondary processor 230, which is a lower power processor than the main processor 210, is added to the power sensitive device 120, also described in further detail below. It should be noted that moving upper layer stack processes to the wireless network circuit 220 and adding a secondary processor 230 can be implemented individually in some embodiments or combined in other embodiments. It should further be noted that causing the upper layer stack to be moved to the wireless network circuit 220 or to a second processor can be originated at the base station 110 or at the remote server 130 or any combination thereof.

In some embodiments, a processor is added to the power sensitive device, e.g., the secondary processor 230. The secondary processor 230 has an interface to both the network circuit 220 and the main processor 210. Further, the secondary processor 230 processes packets, itself, and also is configured to decide which packets do not need the main processor 210 to wake up based on certain criteria, such as whether the packet represents a wireless network circuit event. Thus, in some embodiments, the wireless network circuit 220 can be configured to, upon receiving the packets, decide which packets to send to the main processor 210 and which packets to send to the secondary processor 230.

Specifically, after receiving the network packets, the power sensitive device can first inspect (Step 1810) the received packet-based network traffic and thereafter perform the packet-based network traffic offloading technique discussed here. Depending on the implementation and the stage of the configuration, different hardware portions (e.g., the main processor 210, the secondary processor 230, and/or the wireless network circuit 220) in the power sensitive device 120 or even different entities in the WLAN system (e.g. the access point 110, the remote server 130, in addition or as an alternative to the power sensitive device 120) may perform the role of this first inspection of the packet. In accordance with some embodiments, the secondary processor 230 can perform the packet inspection and offloading. However, in some implementations, it may be a processing core (e.g., an ARM core) in the wireless network circuit 220 that perform the packet inspection and offloading. Additionally, depending on the implementation, the secondary processor 230 may be a physically separated processor (e.g., a co-processor) coupled to the main processor and/or other modules in the power sensitive device, or the secondary processor 230 may be a separate, lower-power processor core but is implemented together with the main processor, for example, on the same semiconductor die or within the same semiconductor packaging.

Further, what kind of traffic can be/suitable to be offloaded depends on the actual implementation and selection of the secondary processor 230 and the processing power inherent in each of the selected hardware components. In addition or as an alternative to a predetermined configuration, some implementations provide that packet inspection and the offloading can be performed (Step 1820) based on a configurable set of rules and/or results from machine learning. The set of rules can have default settings that designate what types of packet traffic can be handled by/offloaded to the alternative processing resource (e.g., the secondary processor 230). The set of rules can also be later adjusted (e.g., by an administrator of the WLAN system, and/or by a remote server downloading to the WLAN system, like a software update) to better suit the purpose of each field application.

In some embodiments, the main processor 210 is configured to learn which packets are unnecessary, such as for example, employing machine learning algorithms. For example, the learning can be done on the main processor 210 and the results can be programmed to the secondary, low power processor 230. As the main processor 210 learns which packets are unnecessary, the main processor 210 may be further configured to communicate that knowledge to the network circuit 220 or to the secondary processor 230. For instance, the unnecessary packet can be added to a (e.g., rule based) table of unnecessary packets and such table can be sent from the main processor 220 to either or both of the network circuit 220 and the secondary processor 230. Additionally or alternatively, the training can be done on the cloud (e.g., on the remote server 130) across multiple devices (e.g., devices in other WLAN systems that are deployed in a similar setting, such as a home surveillance application) and the results of the learning can be programmed to the device at hand, e.g., to secondary, low power processor 230 through the main processor 210.

According to one or more implementation, either at the factory or during an initial set-up/training phase of the WLAN system, the access point 110 and/or the power sensitive device 120 (e.g., by its main processor 210) can first observe and receive training on what traffic on the network need not be processed by waking up the main processor 210 from a sleep (i.e., low power) mode. Such example may be that, even though the packet would normally require a processor of a higher layer function (e.g., an application layer) to process, in the particular practical application (e.g., monitoring the environment as an IP security camera) it can be observed that such packet is not of interest to the power sensitive device 120. Then, after the training, the result (e.g., in the form of a trained data model) can be utilized by the power sensitive device for future determination of packet offloading (Step 1820). For example, if, during the training period, a certain packet (e.g., a broadcast, discovery purpose packet from a certain protocol such as those mentioned above) have been determined as not of interest, then during normal operation (Step 1830), the main processor 210 would stay in the sleep mode and need not wake up even if the power sensitive device receives more of such packets; instead, the secondary processor 230, for example, may process such packets (e.g., by discarding them) in place of the main processor 210, thereby saving the power consumption associated with unnecessarily waking up the main processor 210. In other examples, the alternative processing resource (e.g., the secondary processor 230) may be used (Step 1830) to deal with lower level or routine responses (e.g., keep-alive messages and beacons). In addition to or as an alternative to the power sensitive device performing the inspection and learning for offloading, the access point 110 and/or the remote server may also perform the same or similar techniques and to cause (e.g., by downloading the results to) the power sensitive device to implement the offloading techniques.

In accordance with embodiments, some of the processing that does not require to be performed on the main processor 220 can be integrated in to a processor that is already available. It has been observed that some wireless network circuits, such as the network circuit 220, integrate Advanced RISC Machines (ARM) processors ("ARM cores") for offloading of drivers, which typically are run on the main processor 210. These ARM cores may have enough processing power to process the packets that do not need to main processor 210 to wake up. Typically, the network circuit 220 operates on layers up to layer 2 and leaves the higher layers for the main processor 220 to process. However, some embodiments include moving some of the upper layer processing which makes the main processor 210 wake up unnecessarily to the offload processors of the network circuit 220.

Changing Power State of Power Sensitive Wireless Device Based on Location of a Portable Device To manage the power consumption of a power sensitive device, it is beneficial for such device to have different power settings based on the needs of a select user ("user") of the device or based on any other desirability, at the moment. A select user can be, for example, an owner or an administrator of the WLAN system. A method of designating such a select user can be, for example, the user using a software application (e.g., a mobile application) running on a user's mobile device and logging in as a select user. The list of the select users can be identified by suitable ways including, for example, the administrator of the system making such designation in cloud server (e.g., remote server 130), or by logging onto an administrator's configuration page of the base station of the wireless network system 110. For example, a security camera system can need a different power setting based on whether the user(s) is home (and the security camera system can be disarmed or have a lower engagement, for instance) or whether the user(s) is outside of the home (and the security camera system needs to be fully or close to fully operational).

In some embodiments, the power setting and state of the power sensitive device can be changed based on checking the WLAN association of the portable device that user may be using (e.g., a smartphone or a tablet computer), discussed in further detail below. In some embodiments, the power setting and state of the power sensitive device can be changed based on the Global Positioning System (GPS) location of the portable device, also discussed in further detail below. It should be noted that the power settings of the power sensitive device that may be modified in accordance with embodiments include the wireless power state, the wireless wake up period, sensory related settings, or main processor (e.g., central processing unit (CPU)) settings.

With regard to the wireless-related settings of the wireless network circuit 220, it is known that such network circuit can be in different power states. In particular, when the wireless network circuit 220 of the power sensitive device 120 is in sleep mode, the network circuit 220 periodically wakes up to receive a beacon, e.g., the delivery traffic indication message (DTIM) beacon. The DTIM beacon is a beacon that is broadcast typically from an AP to a device that uses power-save mode and that contains an interval setting (e.g., DTIM) for the beacon delivery. A DTIM is a type of traffic indication map (TIM), which indicates to a client about the presence of buffered multicast/broadcast data on the access point. Thus, in accordance with this technology, when the network circuit of the power sensitive device is in sleep mode, the network circuit periodically wakes up to receive the beacon, e.g., the DTIM beacon. Typically, the period in which the network circuit wakes up is controlled by the AP. The AP can change the DTIM for a subset of communicatively coupled power sensitive devices based on the delay requirement (e.g., based on traffic requirements and to avoid transmission collisions in the network). The delay requirement may different if user is home or outside of the home. Thus, in accordance with some embodiments, the AP can be configured to change the timing for a DTIM for the power sensitive device based on the specific delay requirement in real-time received from the power sensitive device. In an embodiment, the timing is changed further based on the result of detecting, by the base station in the WLAN system, whether the select user is within a predetermined physical proximity to the WLAN system.

In some embodiments, to save the power consumption of the power sensitive device 120, the power sensitive device 120 and the base station 110 are each configured to use or coordinate in an extended sleep mode, such as for example wireless network management (WNM)-Sleep mode as defined in IEEE 802.11 family of standards (e.g., 802.11v), based the result of detecting the location of the portable device 130. For purposes herein, WNM-sleep mode is an extended power-save mode for the power sensitive device 120, where the power sensitive device 120 is not required to listen for every DTIM beacon frame and is not required to perform other network related updates. Thus, in accordance with some embodiments, the extended sleep mode enables the power sensitive device 120 to signal to the base station 110 (or any AP) that is will be in sleep mode for an extended period of time. While in extended sleep mode, the power sensitive device 120 continues to be associated with the base station 110, yet is not required to receive or send packets from and to the base station 110. It should be noted that in some embodiments, extended sleep mode can be used in combination with location based wireless setting change without AP involvement.

In some embodiments, the settings of sensors can be modified based on location of the user or (e.g., location of the portable device). For example, camera settings, such as the frame rate and/or the compression ratio of the camera on the power sensitive device, can be modified based on location of user or the portable device, as discussed in detail below. As well, motion detector settings can be modified when people are in home (also discussed in further detail below). For example, the motion detector can be disabled or the motion detector sensitivity can be changed, both based on detected location criteria of the user or portable device. As another example, the frequency with which the passive infra-red sensor of the motion detector is monitored can be changed. In the case of array sensors, such as infrared array sensors, the number of array sensors can be reduced, in addition to reducing the sampling frequency to save power, according to some embodiments. For example, responsive to the result of detecting that a select user is within a predetermined physical proximity to the WLAN system, the power sensitive device can change a sampling frequency that the power sensitive device monitors of a passive infra-red sensor. As another example, responsive to the result of detecting that a select user is within a predetermined physical proximity to the WLAN system, the power sensitive device can change a number of sensors that the power sensitive device monitors in an infrared sensor.

Figure 3:
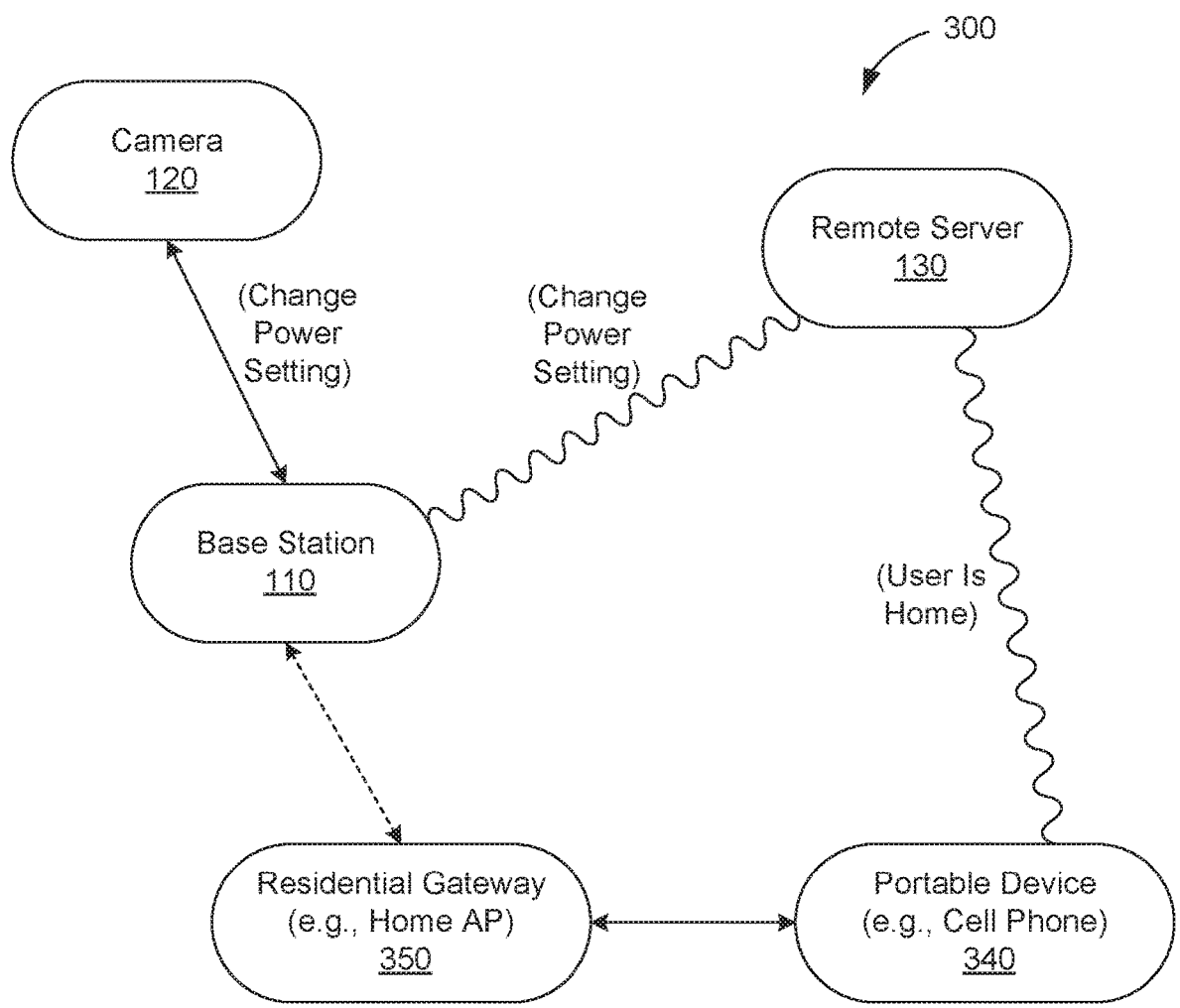
FIG. 3 is a functional diagram illustrating certain implementation details of a specific example of changing the power state of a power sensitive device based on location of a portable device, in accordance with some embodiments.

In some embodiments, the power settings of the power sensitive device 120 can be changed based on location (e.g., the location of a portable device of the user). Embodiments of the innovation can be understood with reference to FIG. 3. FIG. 3 is a functional diagram 300 illustrating certain implementation details of a specific example of changing the power state of a power sensitive device based on location of a portable device, in accordance with some embodiments. As mentioned above, in some embodiments, location may be detected using GPS and the application that is run on the portable device 340 of the user, which is used, for example, for monitoring the sensors of the security camera system. For example, the detecting can be based on a location of the select user as reported by a global positioning system (GPS) of a portable device of the select user.

Other various embodiments for detecting location are contemplated, as follows. In accordance with some embodiments, the application on the portable device 340 is communicatively coupled to the remote server 130 (e.g., the cloud). As well, the remote server 130 can communicate with the power sensitive device 120 directly or can communicate with the residential (e.g., home) gateway or home AP 350 or sensor gateway (not shown) to change the power setting of the power sensitive device 120. In other embodiments, the portable device 340 when appropriately configured can directly communicate with the sensor gateway (not shown), the home AP 350, or sensor AP (not shown). In other embodiments, the portable device 340 can be configured to communicate directly with the power sensitive device 120. In other embodiments, the network circuit connection of the portable device 340 belonging to the user of system can be detected to the home AP or home gateway 350. In this case, the home or sensor gateway 350 instructs the power sensitive device 120 to change power settings. In some embodiments, a multicast discovery mechanism can be used to detect that a low power device such as the portable device 340 is within the home network (e.g., associated with the home AP 350) and the mechanism can instruct the power sensitive device 120 to change its power setting. In some embodiments, LTE related location information are used to detect the vicinity of the power sensitive device 120 and the portable device 340. For example, the detecting is based on Long-Term Evolution (LTE) related information from a portable device of the select user. Based on such detection, instructions can be sent to the power sensitive device 120 for changing the power settings. In other embodiments, the telephone application interface may be used by the user to indicate that the user desires to change the power settings of the power sensitive device 120. For example, upon coming home, the user may open the security camera application on his or her cell phone and enter information indicating to change put the camera into extended sleep mode. As another example, the power sensitive device can receive from an application on the portable device of the select user, a user instruction to manually change a power setting of the power sensitive device. In another embodiment, the motion detectors on the power sensitive device 120 can trigger and start recording. It can be detected that the motion is occurring rather frequently and tripping the camera often based on threshold criteria such as a maximum number of trigger events in a predetermined interval. The user can be asked to confirm whether he or she is at the premises. For example, the number of triggering of the motion sensor can get send from the power sensitive device 120 via the base station 110 for arrival at the remote server 130. The remote server 130 can be configured to determine that the threshold of number of motion detection triggers has been exceed and can send a message intended for the application on the user's cell phone to alert the user. For instance, the message can ask the user to confirm that he or she is, indeed, home. Then, upon learning that the user is home, the remote server 130 can instruct the power sensitive device 120 via the base station 110 to disarm and go into low power mode or sleep mode to save battery power.

It should be noted that any of the location detection techniques disclosed above can be used singly or in combination. For example, one embodiment may allow location detection by GPS and the application on the portable device 340, in addition to multicast discovery. For example, the detecting can be based on a multicast discovery mechanism of the WLAN.

Figure 4:
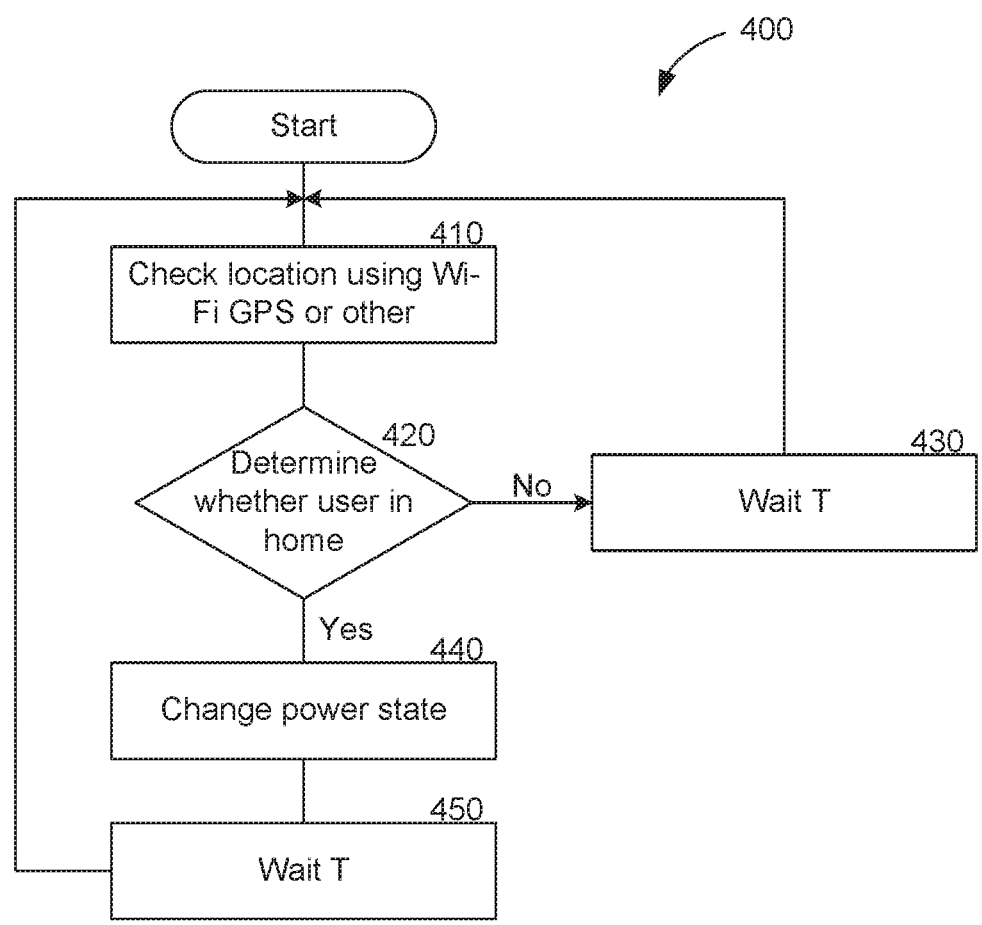
FIG. 4 is a flowchart illustrating a method for changing the power state of a power sensitive device based on location of a portable device, in accordance with some embodiments.

Some embodiments can be understood with reference to FIG. 4, a flowchart 400 illustrating a method for changing the power state of the power sensitive device 120 based on the location of the portable device 340. As mentioned above, the location of the portable device 350 of the user can be periodically monitored or checked (410) using various mechanisms such as GPS, multicast, and so forth. When the method determines that the user is not home (420), e.g., using GPS determined that the portable device 350 is not close to the power sensitive device 120, then the method waits for a predetermined amount of time (430) before checking location again (410). When the method determines that the user is at home (420), e.g., using GPS determined that the portable device 350 is within a certain proximity to a designated area (e.g., within a communication range of the base station, within a geo-fence (further discussed below), and/or in some examples, the power sensitive device 120 itself), then the method causes (e.g., by sending instructions) the power sensitive device 120 to change the power settings (e.g., wake from sleep mode)(440), after which the method again waits for a predetermined amount of time (450) before checking location again (410).

Figure 11:
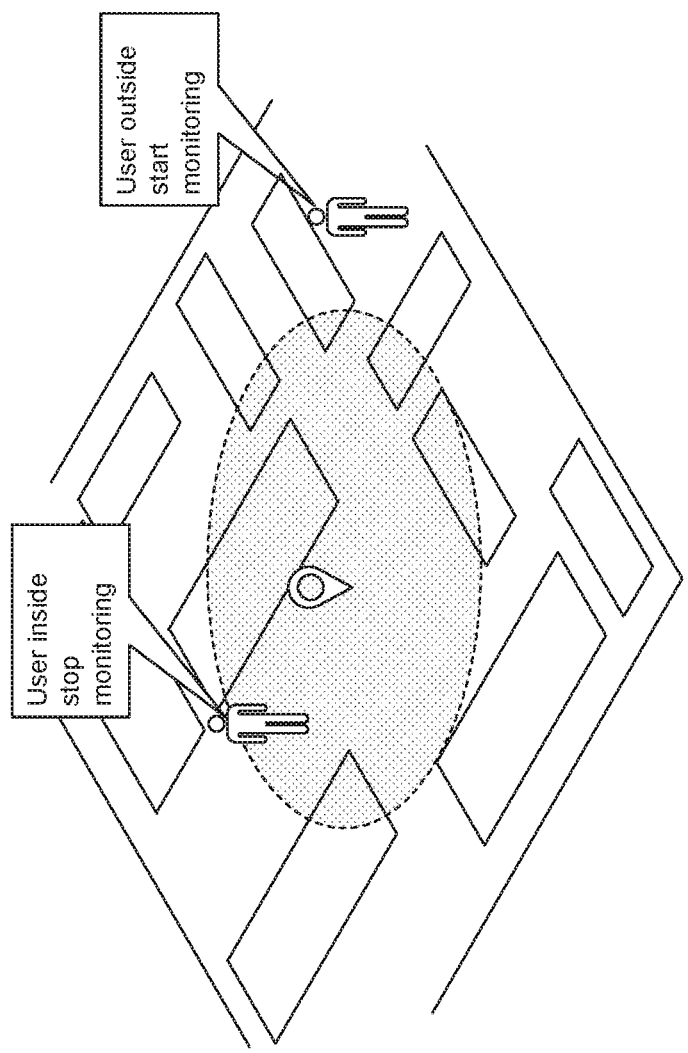
FIG. 11 is an example diagram illustrating the starting and stopping of a monitoring process based on whether a person is in or outside a geo-fence in accordance with some embodiments.

In some embodiments, location detection mechanisms employ a geo-fencing technique for implementing the power saving techniques introduced here. The geo-fencing technique allows a user to define a geo-fence (that is, a virtual fence with a perimeter defined by the user based on a number of specified geographic points). In some examples, such as a factory default mode for the base station, the geo-fence can be set as simply as a predetermined physical proximity to the WLAN system and/or the power sensitive device 120, such as introduced above. Additionally or alternatively, some embodiments provide that the remote server and/or a software application (e.g., a "mobile app") may employ a graphic user interface (e.g., to display an interactive map) to allow an authorized user (e.g., an owner or an administrator) to enter and define a geo-fence that he or she sees fit, so as to have a customizable area he or she wants the system to monitor (e.g., for security purposes and/or for deploying the power saving techniques introduced here). Geo-fencing can enable remote monitoring of an entity at a specific location (e.g., a home) surrounded by a virtual fence (e.g., geo-fence), and automatic detections of the user being in or out of the geo-fence. As a result, for example, the system can be configured to start or stop tracking mobile objects within the area of the geo-fence, depending on whether the user is in or out of the geo-fence. For example, the system may start tracking a designated user's mobile device when it is outside the geo-fence. Furthermore, in some embodiments, the power state of the power sensitive device can change by tracking the location of the portable device (e.g., a cell phone) that is equipped with the client application and making decisions with respect to a geo-fence. For example, when the camera is armed (e.g., is in monitoring mode) the system can be configured to wake up the camera(s) more often and/or reduce the DTIM interval. For example, FIG. 11 illustrates the starting and stopping of a monitoring process based on whether a person is in or outside a geo-fence.

Figure 12:
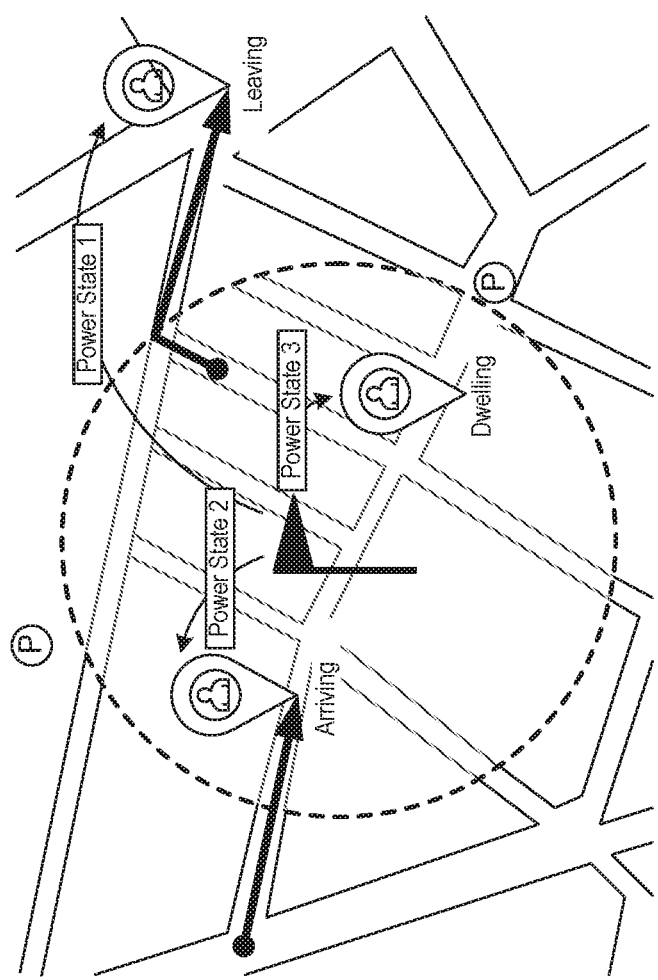
FIG. 12 is an example diagram illustrating three different power states corresponding to three different motional statuses, in accordance with some embodiments.

In some embodiments, the power state of the power sensitive device can be changed by a motional status change. An embodiment can be understood with reference to FIG. 12, an example diagram illustrating three different power states corresponding to three different motional statuses (e.g., arriving, dwelling, and leaving). In the example shown in FIG. 12, when the user with the portable device arrives at the geo-fence, the power sensitive device changes the power state of the power sensitive device to power state 2, based on the automatic detection of the user arriving at the geo-fence. As the user remains within the geo-fence for a predetermined minimum amount of time (e.g., dwelling), the power sensitive device automatically changes the power state to power state 3. As the user departs from the geo-fence, the power sensitive device changes the power state of the power sensitive device to power state 1, based on the automatic detection of the user with the portable device leaving the geo-fence. For example, the power setting can include a first profile, a second profile where the power consumption is greater than that of the first profile, and a third profile where the power consumption is greater than that of the second profile.

In some embodiments, determining the appropriate power setting for the power sensitive device includes comparing a historic location of the portable device to determine the motional status. Then, the appropriate power setting is adjusted based on the motional status. The historic location can be derived from machine learning techniques, where data representing the location of the user/portable device is collected over time and statistical learning techniques are applied to such data to identify patterns.

Figure 13:
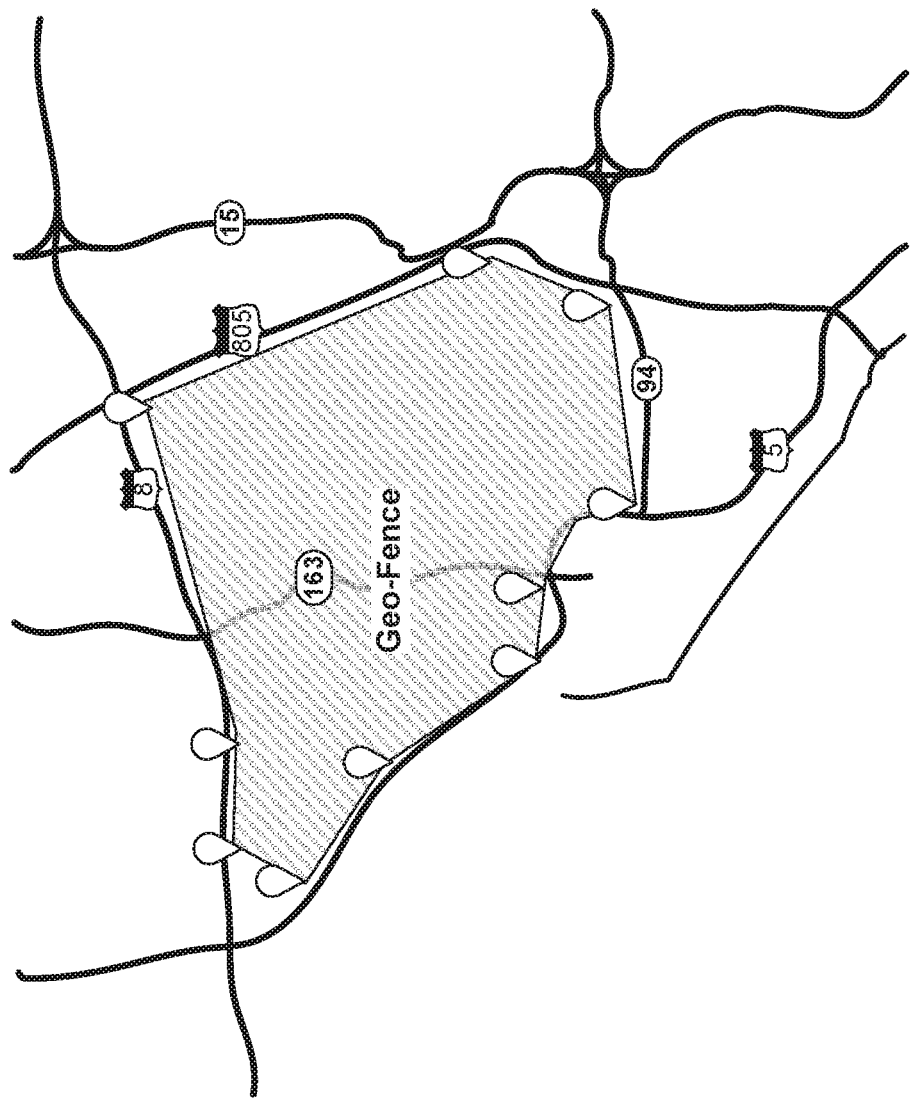
FIG. 13 is an example diagram illustrating a geo-fence drawn on a map, in accordance with some embodiments.

Some embodiments can be understood with reference to FIG. 13, an example diagram illustrating a geo-fence drawn on a map. The user can define a geo-fence over a large geographical area via the remote server or by using the application on the portable device, for example. The remote server and/or the application provide a suitable user-interface for the user to specify the parameters of the geo-fence.

Figure 14:
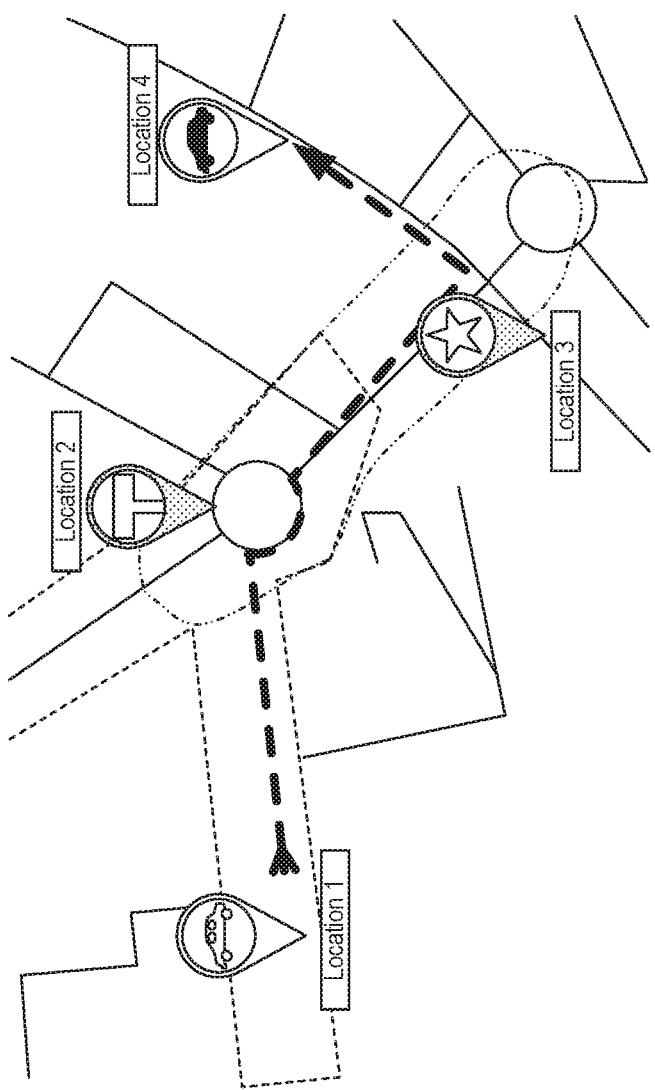
FIG. 14 is an example diagram illustrating a sequence of locations based on how the user with the portable device application moves, in accordance with some embodiments.

Some embodiments can be understood with reference to FIG. 14, an example diagram illustrating a sequence of locations based on how the user with the portable device application moves. The power state of the power sensitive device may be changed based on the sequence of locations.

As an example and with reference to FIG. 14, the user is detected in a first geo-fence (e.g., location 1: an office parking lot), proceeds to a second location (e.g., location 2: a round-about which is near a marked location of interest), proceeds to a third location in a different geo-fence (e.g., location 3: a gas station), and proceed onward (e.g., location 4: the user departs the geo-fence). From this pattern of detected locations, it can be determined from pattern recognition (e.g., more likely than not or exceeding a certain probability) that the user is heading home (or approaching a selected geo-fence or another selected monitoring point) and to change the power setting on the power sensitive device (e.g., put the device in sleep mode).

Figure 15:
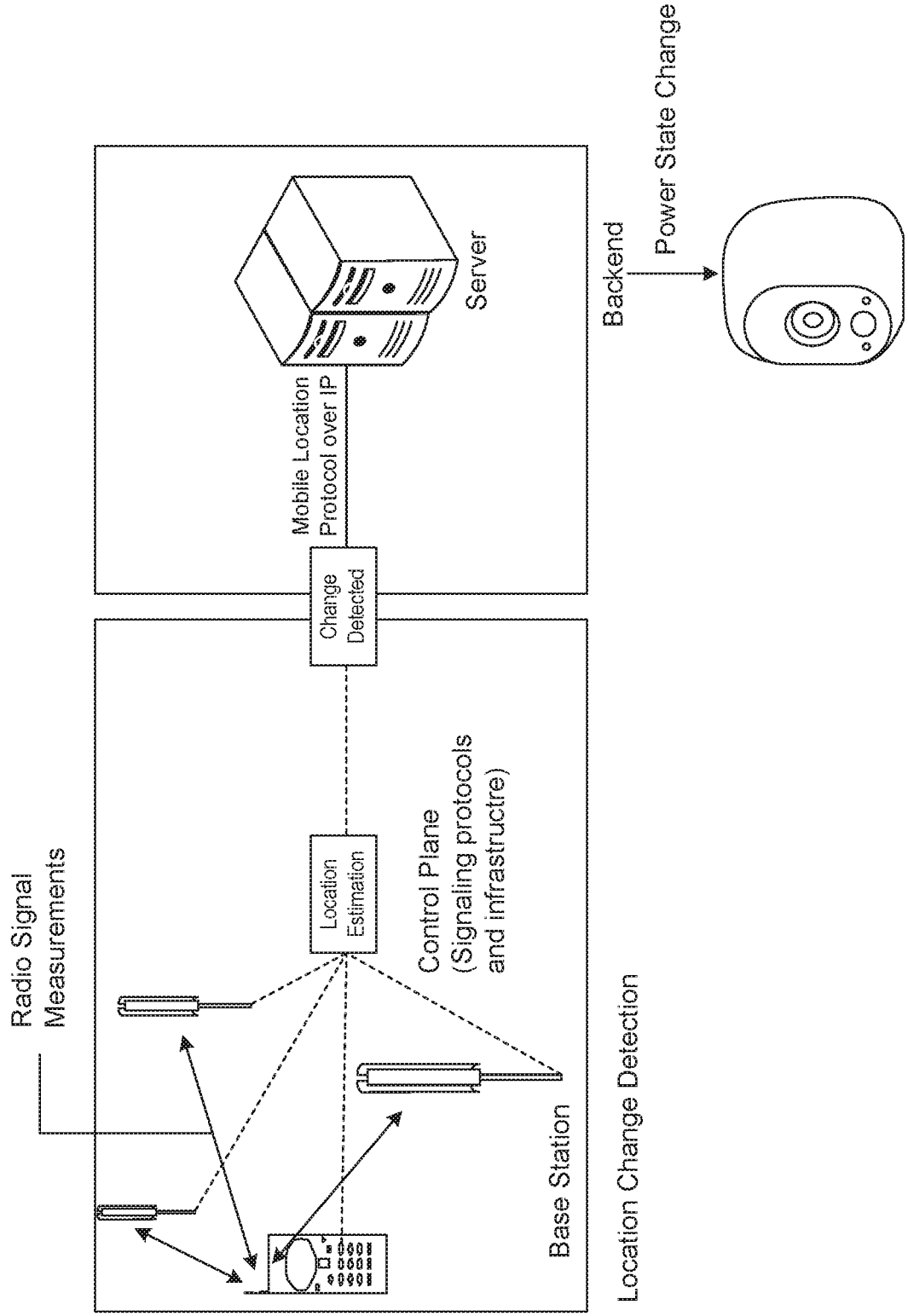
FIG. 15 is an example diagram illustrating a remote cellular communication system sending a location change detection message to the remote server, in accordance with some embodiments.

Some embodiments can be understood with reference to FIG. 15, an example diagram illustrating a remote cellular communication system sending a location change detection message to the remote server. Radio signal measurements are received from the portable device at base stations of a third party. The third party can estimate the location of the portable device and communicate that location and any subsequent changes of the location to the remote server over a communications network (e.g., the Internet). The remote server has an appropriate interface to the communications network for receiving the location of the portable device. Upon receiving the location detection data, the remote server can proceed to change the power settings of the power sensitive device indirectly as described in this disclosure.

Figure 16:
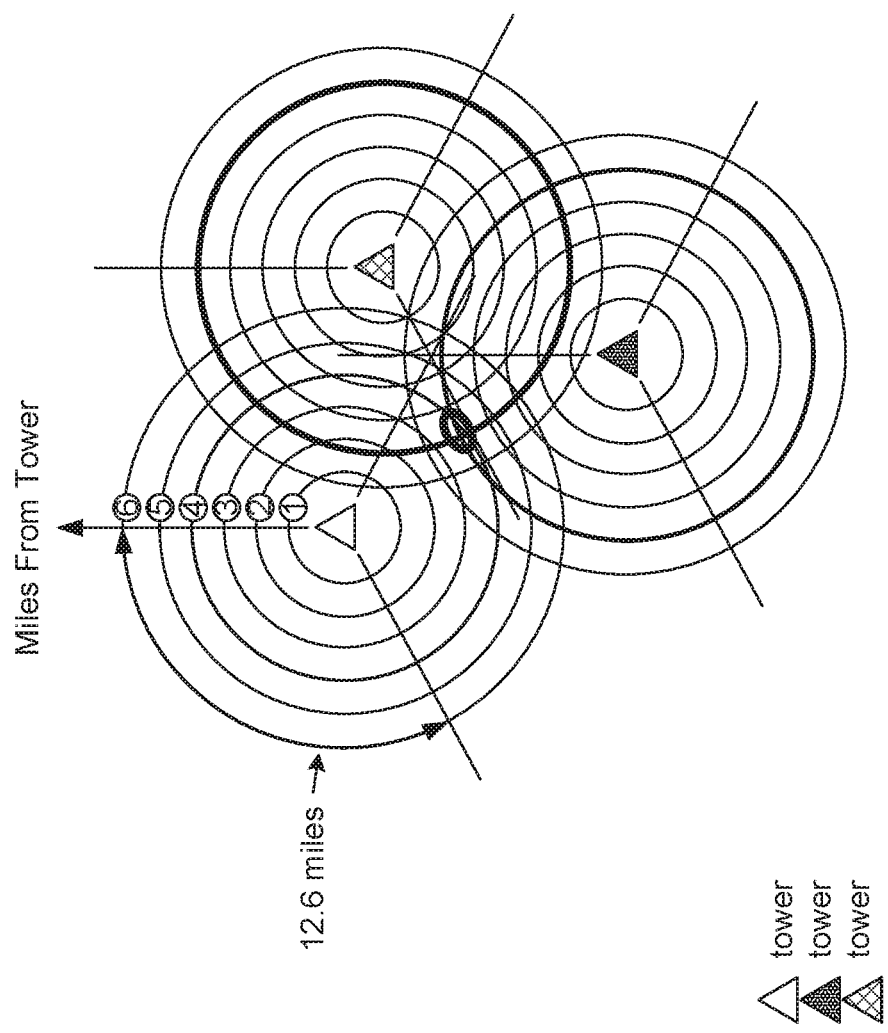
FIG. 16 is an example diagram illustrating cellular tower triangulation for recognizing the location of the portable device, in accordance with some embodiments.
Figure 17:
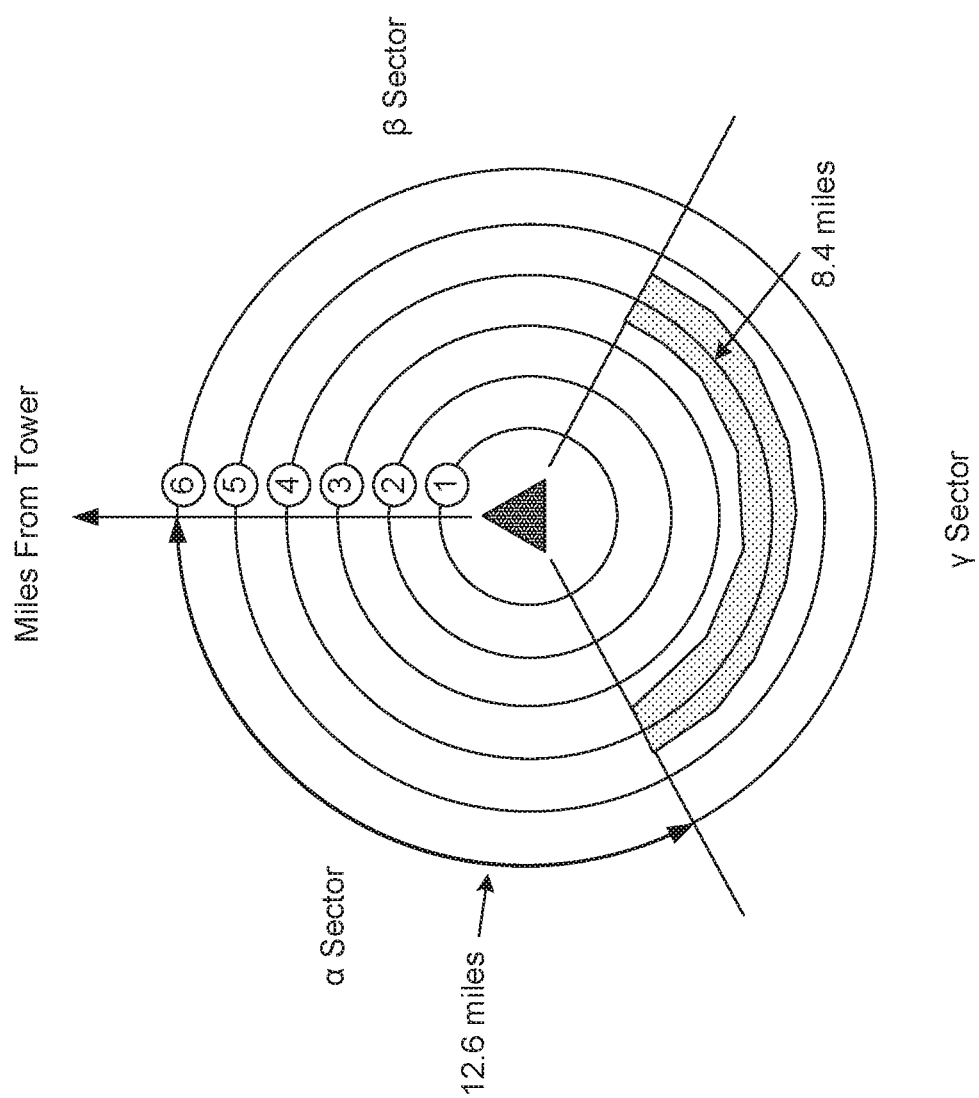
FIG. 17 is an example diagram illustrating a cellular tower and the ranges and sectors from the tower, in accordance with some embodiments.

In some embodiments, cellular tower triangulation is used for recognizing the location of the portable device, as illustrated in FIG. 16. Triangulation is a process by which the location of the radio transmitter of the portable device can be determined by measuring either the radial distance, or the direction, of the received signal from two or three different points. FIG. 17 is an example diagram illustrating a cellular tower and the ranges and sectors from the tower, in accordance with some embodiments;

Using 802.11 For Power Sensitive Wireless Sensors

It is commonly known that the network circuit protocol, 802.11, is available on most home devices with wireless Internet access. This protocol is available on most devices with wireless Internet access. In addition, this protocol is an available technology to use for power sensitive wireless sensors, including, for example:

door sensors;
window sensors;
temperature sensors;
(infrared) IR motion detection sensors; and other power sensitive wireless sensors for which a battery may last for many months or years.

However, it has been found that 802.11 power consumption can be too high for those type of sensors, meaning the power consumed does not correlate to the operation of the sensor. As mentioned above, an example is waking up the main processor 210 for a network circuit event that does not require the power of the main processor 210 to be processed.

In some embodiments, standard 802.11 n/ac/b/g protocols are modified to operate a lower power sensor, such as the network circuit 220, in a way similar to sensors using 802.15.4 based protocols (e.g., Zigbee, Zwave, or Bluetooth). A lower power sensor in this case is a sensor that requires less power to operate than the main processor of the system at hand. While 802.11ah may provide some solutions to requiring less power to be consumed by the power sensitive device 120, such protocol may not be readily available and, additionally, the protocol may not provide enough functionality.

In some embodiments, the network circuit 220 behaves as an 802.11 sensor that is not dependent on receiving the beacon. Instead, the network circuit 220 initiates the communication and asks for appropriate information from the AP (e.g., base station 110). An example of the appropriate information requested by the network circuit 220 include the traffic indication map (TIM) from which the network circuit 220 can determine whether the AP has any buffered frames present for it. As another example, embodiments adopts modified IEEE 802.11 standards such that a dependency on beacon reception for maintaining connection with the power sensitive device becomes reduced or removed.

Also, in some embodiments, to reduce power consumption, the network circuit 220 can ask the AP for timing synchronization data on an as-needed basis. For example, in the security wireless camera environment, the network circuit 220 can send data to the base station 110 when it has data (e.g., video to upload to the remote server 130) and can indicate to the base station 110 during sending the data that it is looking for a TIM in a special beacon for that network circuit 220. The power sensitive device hosting the network circuit (e.g., the power sensitive wireless device 120) stays awake after it sends such data and the AP (e.g., the base station 110) knows to send the packets right after having received the data. In other embodiments, with regard to synchronization between the power sensitive device 120 and the base station 110, the base station 110 can integrate the Timing Synchronization Function (TSF) into the acknowledgement (ACK) downlink data packet. Employing TSF to achieve timing synchronization is well known in the art and does not need to be described herein. It should be noted that in some embodiments, the AP can be configured to send packets solely for synchronization with the power sensitive device 120.

In other embodiments, to reduce the power consumption of the power sensitive device 120, device 120 is configured to rely on the AP to encapsulate the packets in IP and send such encapsulated packets to the appropriate destinations, such as for example, the remote server 130. In some embodiments, the AP assigns the IP address to the client and performs the encapsulation on behalf of the power sensitive device 120. For example, the base station 110 can assign the IP address to the power sensitive device 120 and can encapsulate the packets representing the video which the power sensitive device 120 captured and transmitted to the base station 110. As well, the AP can perform the standard wireless related protocols, such as TCP/IP or UDP/IP, which the client may need to communicate to other devices within a predetermined vicinity (e.g., within the home) or to devices outside. In some cases, the power sensitive device 120 may need to use the Internet Protocol (IP). To save power consumption, the device 120 can be configured to use IP header compressions defined for sensors. Using IP header compression reduces overall byte count, which reduces the number of bytes to be sent or received, which saves power. In another embodiment, the power sensitive device 120 may obtain the IP address and then store such IP address for a predetermined length of time, which reduces power by not having to have the IP address retransmitted. In other embodiments, the power sensitive device 120 may calculate the IP address based on information previously stored in the device 120 or based on a hash function of information that is unique to such device.

In some embodiments, the power sensitive device 120 expects to receive an unscheduled beacon as opposed to receiving periodically sent beacons. Here, the device can wake up at a predetermined time or at a time depending on criteria and receive a beacon. According to some embodiments, the power sensitive device 120 is configured to decide whether to use the TIM information that is embedded in the beacon and to come out of power save. In other embodiments, the power sensitive device 120 can be configured to come out of power save at a predetermined, regular schedule. Or, in other embodiments, the power sensitive device 120 can be configured to come out of or go into power save in accordance with a schedule that is based on a detected battery state of the device 120. For example, if the battery state goes below a threshold, the power sensitive device 120 can go into power save mode. In other embodiments, the wake up behavior (e.g., DTIM) can be communicated to the device 120 by integrating appropriate information into a corresponding field defined in the beacon, ACK packet or management packet.

Figure 5:
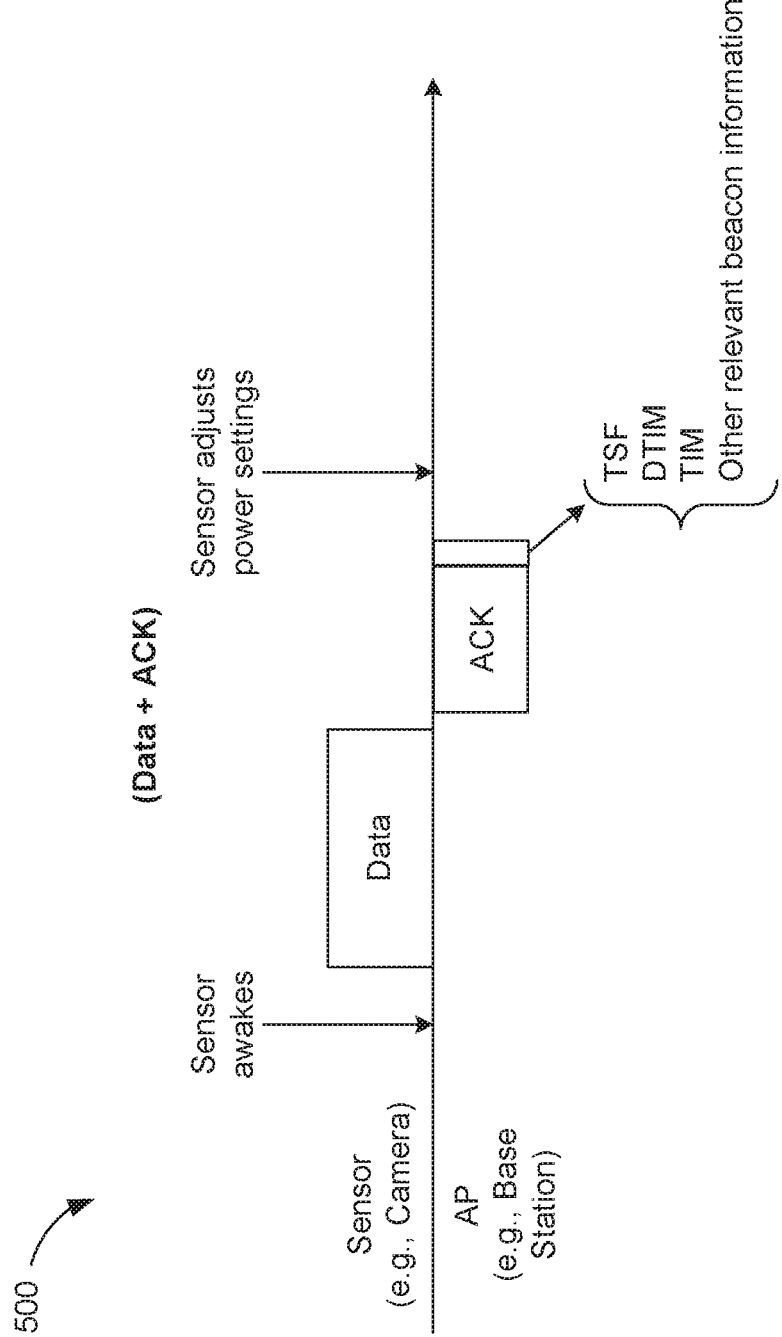
FIG. 5 is a timing diagram for the wireless sensor to receive beacon information from the acknowledgement (ACK) packet transmitted from the base station, in accordance with some embodiments.

Embodiments of the innovation can be understood with reference to FIG. 5, a timing diagram 500 for the wireless sensor to receive beacon information from the acknowledgement (ACK) packet transmitted from the base station. The sensor (e.g., a battery-operated wireless camera) awakes. For example, it may have received a motion trigger from the motion detection sensor to cause the camera to begin recording video data. At some point after awaking, the sensor sends data to the AP (e.g., the base station). Upon receiving the data, the AP sends to the sensor an acknowledgement (ACK) where additional information has been added to the ACK. Examples of such added information include: TSF, DTIM, TIM, and other relevant beacon information.

Figure 6:
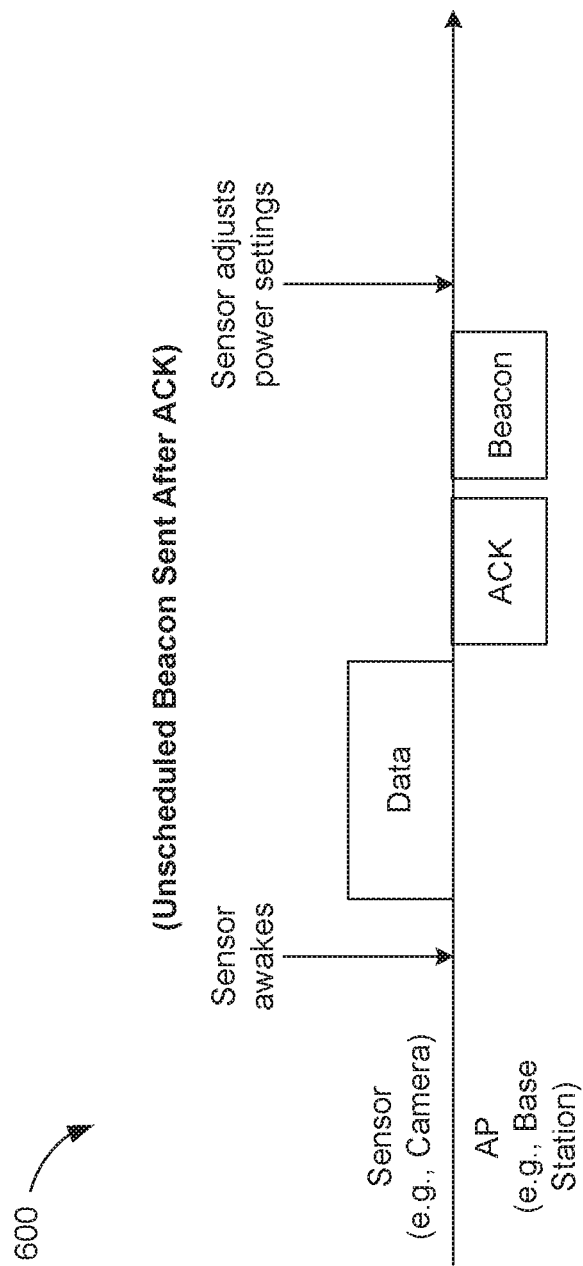
FIG. 6 is a timing diagram for the wireless sensor to receive from the base station an unscheduled beacon packet after the acknowledgement (ACK) packet has been transmitted, in accordance with some embodiments.

Embodiments of the innovation can be understood with reference to FIG. 6, a timing diagram 600 for the wireless sensor to receive from the base station an unscheduled beacon packet after the acknowledgement (ACK) packet has been transmitted. In this example, the sensor (e.g., a battery-operated wireless camera) awakes and, as in FIG. 5, sends data to the AP (e.g., the base station). Upon receiving the data, the AP sends to the sensor an acknowledgement (ACK). The AP is configured to send a beacon for this particular sensor after having sent an ACK to such sensor. On the sensor side, the sensor is configured to stay awake for a predetermined time after having sent data to ensure that it stays awake long enough to receive any beacons coming from the AP. The beacon contains standard beacon-related information for the sensor, such as criteria for the sensor to go in to and out of wake up mode. After having received the beacon, the sensor adjusts its power settings accordingly. For example, after having sent video recordings to the base station 110, the power sensitive device 120 may receive information via the beacon to go into sleep mode. For instance, the remote server 130 may have received an instruction from the user that recording of video by the camera is not needed at this time, which causes the remote server 130 to send via the beacon instructions for the camera to go into sleep mode.

In some embodiments, the power consumption of the power sensitive device 120 is reduced by the AP 110 being configured to improve managing communication from the AP 110 to the power sensitive device 120 one way the AP 110 is configured is to keep packets for the power sensitive device 120 longer than for other 802.11 device, in accordance with some embodiments. The AP 110 can then send the packets in a single aggregation send, rather than cause the power sensitive device 120 to consume power when received packets over multiple transmissions. In regard to keeping packets intended for the power sensitive device 120, the AP 110 can be configured with the either of the following parameters:

No timeout; or

A predetermined very long timeout (e.g., a predetermined timeout that is longer than what is provided in IEEE 802.11 family of standards).

Similar as to what was previously discussed, the AP 110 may use the ACK, beacon, or any other communication that the AP 110 or power sensitive device 120 initiated to integrate the information it wants to send to the power sensitive device 120 or to indicate or to suggest to the power sensitive device 120 that such device is required to come out of its current low power state, in accordance with some embodiments. Subsequently, when the power sensitive device 120 is out of low power state, the AP 110 ensures, based on certain criteria such as the identification of the power sensitive device 120, that the packets of the power sensitive device 120 are assigned the highest priority or one of the highest priorities over some packets destined for other wireless devices. For instance, in some embodiments, existing queues can be cleared by the AP 110 causing packets of the power sensitive device 120 to transmit faster than when not having priority. This technique reduces power consumption by reducing the number of transmissions for the packets destined to the power sensitive device 120.

Embodiments include other techniques for the AP 110 to employ, as follows. In some embodiments, a separate queue may be created by the AP 110 for the power sensitive device 120. In yet other embodiments, beacon, management, or some other type of higher priority queue may be established and used for the power sensitive device 120. In yet other embodiments, certain 802.11 parameters, (e.g., backoff procedure and energy detect(ED)) can be ignored or can be assigned to the most aggressive numbers for the downlink packets, which go out to the power sensitive device 120 once the power sensitive device 120 is out of the power saving state. For example, the AP 110 can be configured such that Short Inter-Frame Space (SIFS) and PCF Interframe Space (PIFS) may be used as backoff procedures waiting for an idle channel, and the ED may be increased to higher numbers. In this way, power consumption is reduced by ignoring packets or by sending the packets out sooner. For example, typically the AP 110 abides by a counter, which typically assigned a random number between zero and 15. In an example implementation, the AP can choose a number between zero and four, e.g., a more aggressive assignment such that these packets, which are short as they contain one byte of information, go out quicker. An example of ED being increased to higher numbers is as follows. Some embodiments include an energy level threshold such that if the detected energy of a channel is higher than the threshold, then the channel is considered busy. Thus, by increasing the threshold for power sensitive devices, because the packets are short, there is a good likelihood that the transmission will be successful. It is noted that even if the transmission is not successful, because the packet size is short, the retransmission also has a high likelihood of being successfully transmitted.

To save power consumption on the power sensitive device 120, some embodiments provide different rate controls for either the power sensitive device 120, the AP 110, or both. One reason to set different rate controls is because it is contemplated that because the power sensitive device does not receive or send many packets, common rate control mechanisms of the art may not have enough packets from which to learn. Another reason is that because the sensor sends one byte of data, some embodiments enable using a lower or the lowest data rate for such packets or having the default rate be a fixed low rate. However, assume there is a request to upgrade some software on the sensor, then there is much more data being sent to the sensor. Thus, according to some embodiments, the data rate is increased (e.g., to a higher or even the highest rate) in this situation for better results and productivity (e.g., an efficient software upgrade). In other embodiments a rate control mechanism with very long memory may be used. For example, some embodiments employ a non-standard rate control mechanism that includes an extended expiry time for communication between the base station and the power sensitive device. Further, in some embodiments, a different retry mechanism with more aggressive fall back rate may be used. For example, in accordance with some embodiments, a different retry mechanism is implemented in which the power sensitive device 120 wakes up and does not perform any listening related operations before sending the one byte (e.g., the one number that the sensor is configured to send). Not having the power sensitive device 120 be required to listen before sending saves on power consumption. Continuing with this example, if the power sensitive device 120 receives an ACK, then the transmission was successful. However, if not, the different retry mechanism attempts a subsequent transmission of the number. It has been found that the likelihood of the second (or retry) submission is high, because the packets are short. When in the case it appears that the send is not successful (e.g., after a predetermined number of retries), the power sensitive device can be configured to then engage in listening operations before sending the packet. In other words, the different rate mechanism can include operations of the standard retry mechanism, which listens before talking. Thus, using the different rate mechanism as described above saves a lot of power.

It is known that aggregation is used to improve performance of 802.11, such that the frame header is not sent for every byte of data. It should be noted that standard aggregation technology is not taught herein as one skilled in the art would readily understand standard aggregation of packets as it relates to 802.11. Aggregation of packets reduces overhead operations and increases the throughput (TPUT). Although, aggregation does introduce some delay in the communication. In the present disclosure, because the packets of the power sensitive device 120 are typically small, there is very little need for aggregation or, in some cases, no aggregate may be needed or used at all. For example, aggregation may not be useful for the low data rate application, because there is some overhead to set up the aggregation at the beginning stage. Further, there is very little to no need for handling the Block ACK mechanism, which is a mechanism for transmitting blocks of data frames from the originator to the recipient to improve MAC efficiency. Block ACK mechanisms are not taught herein as they are readily understood by one skilled in the art. Therefore, taking the above criteria into consideration and in accordance with some embodiments, the packet aggregation settings can be adjusted. The size of the packet aggregation shall be changed dynamically (e.g., near real-time and based on criteria including present power state and current network traffic with the power sensitive device) by the AP 110 to reflect the power state and the current network traffic with the power sensitive device that the device needs to be supported. Thus, in some embodiments, for regular packets containing short packets, no aggregation is used or a small aggregation size is used, where the small aggregation size corresponds to the short packets. For more data intensive items, such as data log dumps or data trends, the AP 110 aggregation size may be increased by the AP 110. For example, the aggregation size may be increased to a mid-range size or near mid-range size (e.g., a size that is between the shortest size to the maximum size and that corresponds to the size of the packets). For other situations, such as for firmware upgrades to the sensor, large or the maximum aggregate size can be used. Further, when, at any time, there is a lot of data (e.g., for a firmware upgrade), then a negotiation can take place in real-time to negotiate aggregation size, in the manner discussed above. Moreover, it should be noted that standard aggregation in 802.11 typically creates a delay. For instance, after receiving a first packet, the receiving entity may wait a predetermined amount of time to determine whether a second (or more) packet(s) will arrive. That wait time is the delay. In accordance with the present disclosure, because the AP and the power sensitive device 120 can be configured to send sensor data right away, unless instructed to negotiate aggregation, then there is no delay, which also saves power consumption.

802.11 Synchronization Improvement for Saving Power Consumption and Mac Efficiency In accordance with some embodiments herein, power consumption can be reduced by improving synchronization. Various techniques for improving synchronization are discussed in detail below. In other words, the asynchronous nature of the network causes unnecessary power to be consumed by the power sensitive device 120. It is known that 802.11 is a protocol in a network where different APs are not synchronized. Clients synchronize themselves by updating the clock. There is no time tracking phase lock loop (PLL)-like mechanism implemented. As a result there are two sets of problems, as follows. First, the power sensitive device 120 is required to wake up to get the TSF timer from the AP 110. Second, when different APs are not synchronized and they coordinate, the result is a MAC efficiency problem.

With regard to the first problem, as discussed above, waking up the main processor 210 unnecessarily causes a power consumption penalty. This is because the client (e.g., the power sensitive device 120) needs to wake up frequently to get the beacon to be synchronized which results in large power consumption. Also, presently, the client needs to wake up earlier than beacon to accommodate the client clock inaccuracy which result in even more power penalty. With regard to the second problem, different APs cannot coordinate and time share properly. They rely on EDCA and, thus, MAC efficiency is dropped. Different APs cannot coordinate and time share properly and they rely on Enhanced Distributed Channel Access (EDCA) and MAC efficiency is dropped.

Various embodiments provide various improvement mechanisms for the client-AP (e.g., power sensitive device 120-base station 110) case to save power, as discussed below. Some embodiments employ, by the base station, a synchronization mechanism before communicating with the power sensitive device, wherein the synchronization mechanism is characterized at least by offloading a portion of processing tasks associated with synchronization from the power sensitive device to the base station. In other embodiments, a mechanism is provided where the client can calculate the clock frequency offset between the AP and itself and does self-correction for layer 2 and does not solely rely on updating the clock using TSF. This mechanism can be used to save power. In accordance with another mechanism, for every packet that is transmitted from the AP to the client, the clock frequency offset (CFO) is calculated at the beginning of the packet and applied. The CFO from CFO calculation during the preamble can be used as way to learn (e.g., "see") the crystal offset. Pilots in packets may be used. Calculating the TSF offset over time and tracking the trend may be used. A new packet exchange may be used to track the clock frequency and phase and perform compensation operations. Synchronization from the 802.11 specification that is done for localization may also be used to further improve client-AP synchronization.

Figure 7:
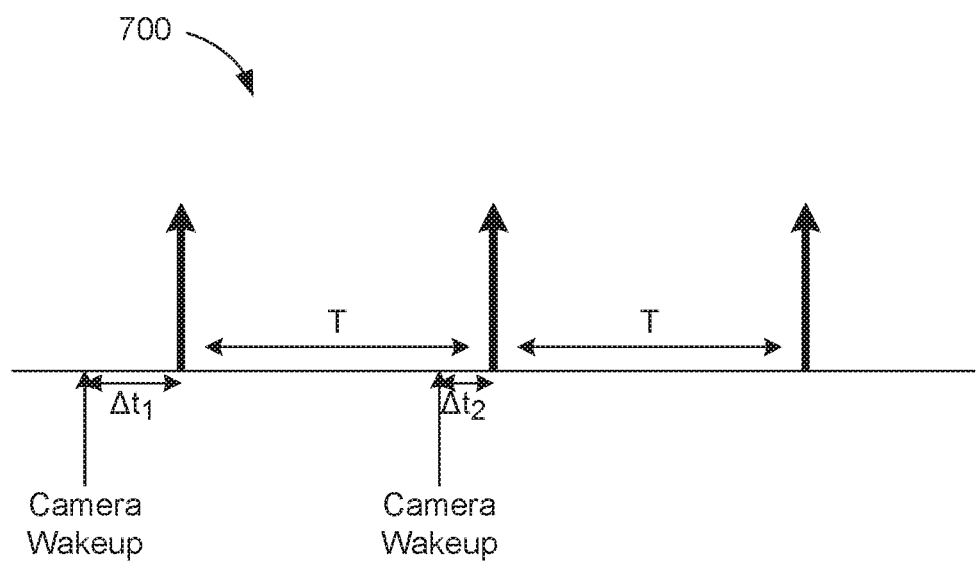
FIG. 7 is a timing diagram for determining an estimate of the clock drift to use in reducing synchronization calculations, in accordance with some embodiments.

One embodiment can be understood with reference to FIG. 7, a timing diagram 700 for determining an estimate of the clock drift to use in reducing synchronization calculations for synching every exchange, to save power. The client (e.g., camera) wakes up before the beacon to accommodate an unsynchronized clock with the AP. The interval of time from when the camera wakes to when the beacon arrives is calculated and saved as $\Delta t_1$. After a predetermined wait time for another beacon (it does not have to be the next, subsequent beacon), the interval of time from when the camera wakes to when the second beacon arrives is calculated and saved as $\Delta t_f$. After at least two intervals are calculated and saved, then the difference between those intervals (e.g., $\Delta t_2 - \Delta t_1$) is calculated. It is the difference between these two differences of the early wake up time to the arrival of the beacon, that is used to compute an estimate of the camera's clock drift.

Figure 8:
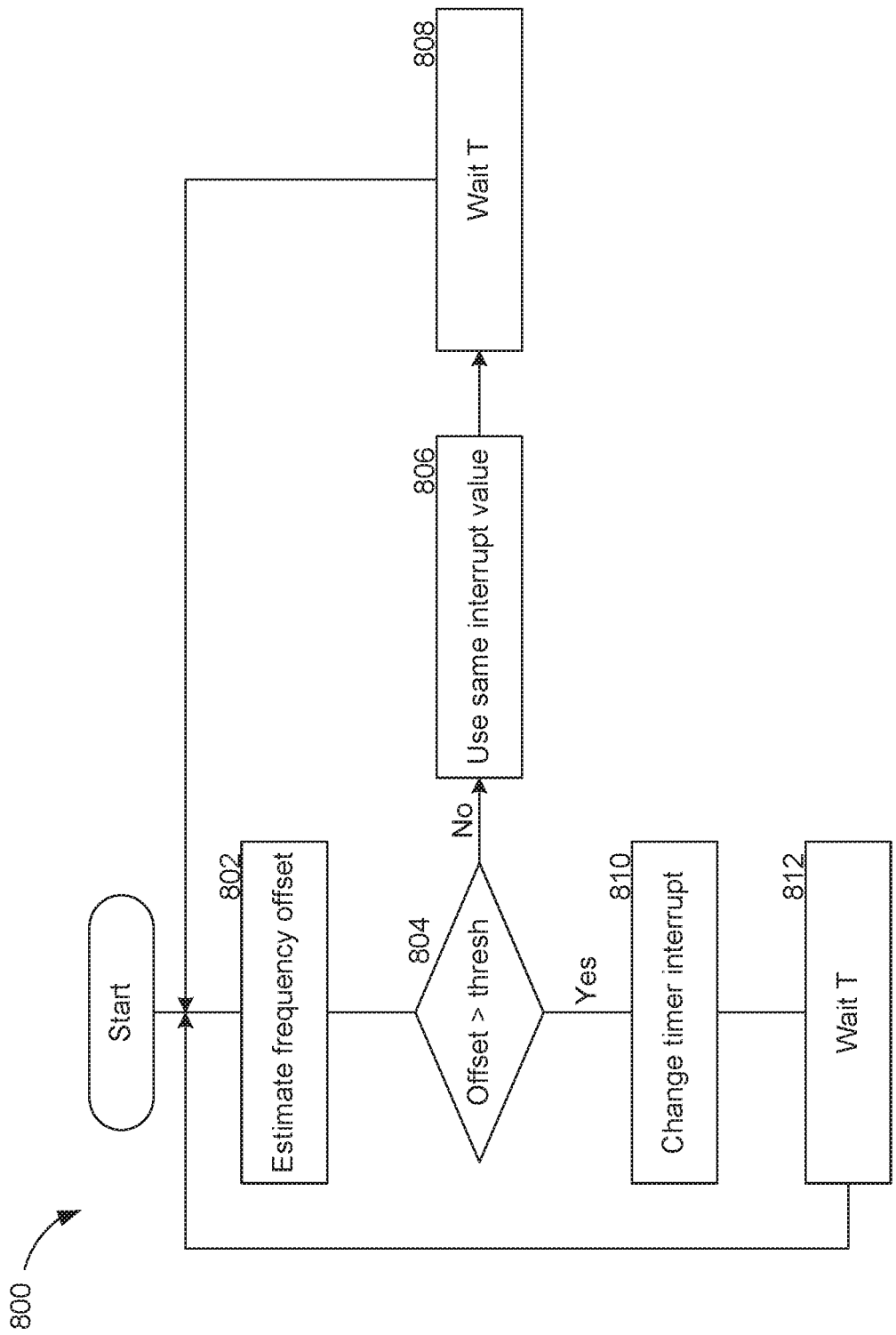
FIG. 8 is a flowchart illustrating a method for determining an estimate of the frequency drift to use in reducing synchronization calculations, in accordance with some embodiments.

Another embodiment can be understood with reference to FIG. 8, a flowchart 800 illustrating a method for determining an estimate of the frequency drift to use in reducing synchronization calculations for synching every exchange, to save power. When the AP (e.g., the base station 110) sends packets to a client (e.g., the camera), the AP attempts to send the packets at some certain frequency. For example, assume that the AP is sending the packet to the client at 5850 megahertz. But the client receives the packet at 5800 megahertz. Thus, the frequency drift is 50 kilohertz. This frequency drift can be used to figure out how much clock drift the other side has, because the clock comes from the oscillator. Once the oscillator drift is figured out, it can be compensated for once, which saves power. An exemplary technique is discussed referring to FIG. 8. Once the frequency offset is known, it can be applied to allow processing without recalculating the frequency offset for every packet. A margin of error (e.g., an offset threshold) is applied to account for the case when even the known frequency offset may be incorrect or drift for any reason. Thus, according to this technique, the frequency offset (e.g., an estimate of the frequency offset) is calculated (802) as discussed above. The technique determines whether the calculated offset is greater than a predetermined threshold (804). If so, then the timer interrupt value is modified (810), accordingly, to account for the offset. The client goes into a different state and waits (812) until it's time to estimate the frequency offset again (802). When the calculated offset is not greater than the predetermined threshold (806), then the timer interrupt value remains the same and the goes into a different state and waits (808) until it's time to estimate the frequency offset again (802).

With regard to synchronization between different AP's, some embodiments recognize that synchronization between different APs may be used to better time share. Different APs can be synchronized using synchronization mechanisms that are defined for wired and wireless networking. Examples of such synchronization mechanisms and their respective accuracies include:
  IEEE 1588—Sub micro second;
  GPS—Sub micro second;
  TTP—Sub micro second;
  NTP—Few millisecond; and
  SERCOS—Sub micro second.

With regard to these synchronization protocols, the following is set forth: For IEEE 1588, the target is groups of relatively stable components, locally networked (a few subnets), cooperating on a set of well-defined tasks. For NTP: (Network Time Protocol, RFC 1305), the target is autonomous systems widely dispersed on the Internet. For GPS: (Satellite based Global Positioning System of the US Department of Defense), the target is autonomous, widely dispersed systems. For TTP(www5ttpforumeorg), SERCOS (IEC 61491), the target is tightly integrated, usually bus or specialized TDMA network based closed systems.

Accuracy can be further improved by listening to the packets of other APs and the respective calculated CFO between different APs. Also, in some embodiments, A different duration of synchronization technique on the order of tens of milliseconds can be assigned, which cause MAC efficiency to be greatly improved. It should be noted that these mechanisms can be used for deployed mesh networks.

Figure 9:
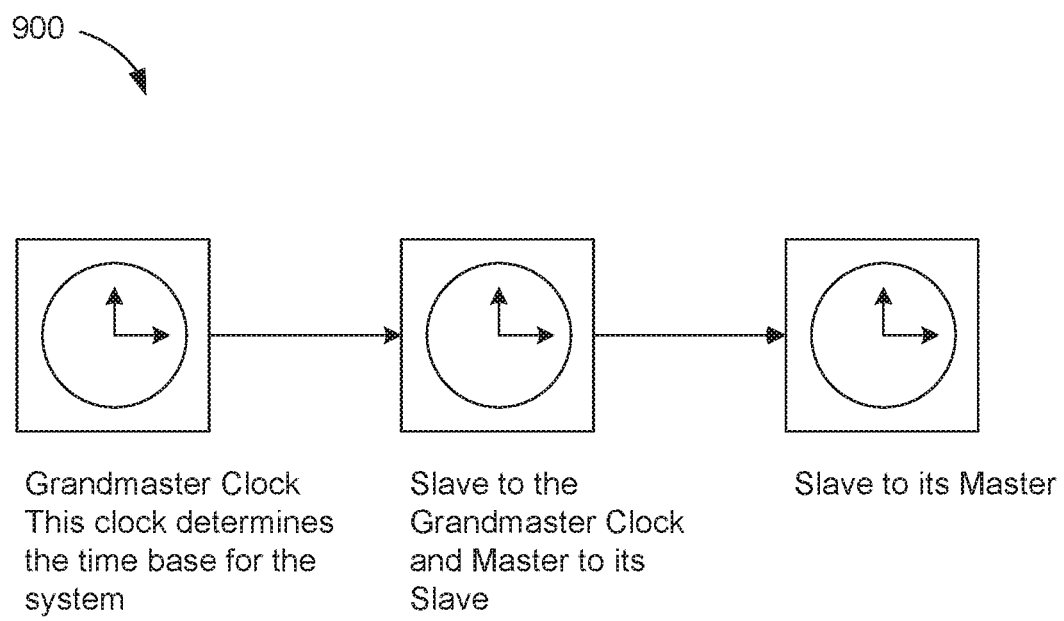
FIG. 9 is a high-level functional block diagram illustrating IEEE 1588 synchronization, which can be implemented by the base station, in accordance with some embodiments.
Figure 10:
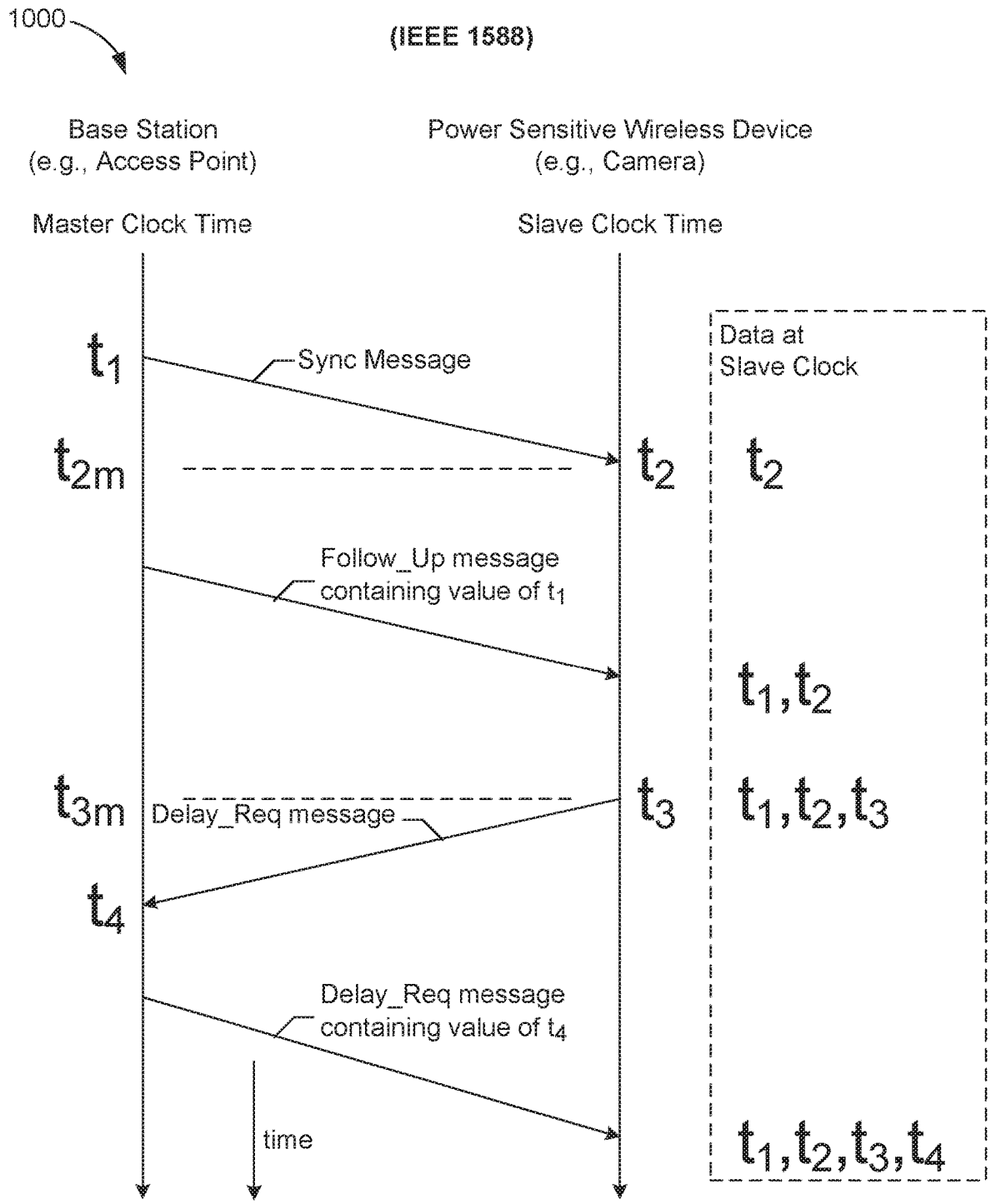
FIG. 10 is a diagram illustrating a precision time protocol defined in IEEE 1588, which can be implemented by the base station, in accordance with some embodiments.

Present embodiments recognize that IEEE 1588 synchronization may be a good candidate for synchronizing client-AP communication. It should be appreciated that IEEE 1588 is a protocol designed to synchronize real-time clocks in the nodes of a distributed system that communicate using a sub microsecond network. For purposes of understanding, refer to FIG. 9, a high-level functional block diagram 900 illustrating IEEE 1588 synchronization, which can be implemented by the base station 110 for example. Also, one skilled in the art would readily recognize IEEE 1588 synchronization, as depicted in FIG. 10, a diagram 1000 illustrating a precision time protocol defined in IEEE 1588, which can be implemented by the base station 110 for example. Therefore, in some embodiments, by improving synchronization, beacon reception time can be greatly reduced (e.g., almost of not exactly by half of its time according to prior art procedures).

Accuracy can be further improved by listening to the packets of other APs and the respective calculated CFO between different APs. Also, in some embodiments, a different duration of synchronization technique on the order of tens of milliseconds can be assigned, which cause MAC efficiency to be greatly improved. It should be noted that these mechanisms can be used for deployed mesh networks.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for reducing power consumption of a power sensitive wireless device ("power sensitive device") operating in a wireless local area network (WLAN) system, the method comprising:
  receiving packet-based network traffic including a packet;
  inspecting the packet and applying a network traffic offloading technique by determining, based on the packet and a trained machine learning data model that has been trained on what processing resource is necessary for processing a certain network packet, whether to wake up a main processor of the power sensitive device from a sleep mode, or to utilize an alternative processing resource, to process the packet, said determining including:
    identifying the packet as belonging to a layer in a plurality of layers, each layer in the plurality of layers indicating a power consumption associated with processing the packet, a highest layer in the plurality of layers indicating that the main processor is needed to process the packet, upon identifying the packet, determining, based on the packet and the trained machine learning data model, to not wake up the main processor, even when the packet is associated with the highest layer in the plurality of layers, and to utilize the alternative processing resource, wherein the power sensitive device is configured to function as a client device to provide supplemental services from hardware on the power sensitive device to a wireless access point of the WLAN system; and in response to a result of said determining, selectively causing the main processor or the alternative processing resource on the power sensitive device that is less power consuming than the main processor to process the packet.

2. The method of claim 1, wherein, upon determining that the main processor is not to wake up, the alternative processing resource is caused to process the packet-based network traffic.

3. The method of claim 1, wherein, upon determining that the main processor is to wake up, the main processor is caused to process the packet-based network traffic.

4. The method of claim 1, further comprising:
receiving a set of rules and/or the trained machine learning data model from the wireless access point of the WLAN system or from a remote server coupled to the WLAN system.

5. The method of claim 1, further comprising:
performing machine learning training on a number of packet-based network traffic to establish the trained machine learning data model.

6. The method of claim 5, wherein a machine learning training is performed on a remote server or on the main processor.

7. The method of claim 1, wherein the alternative processing resource is a secondary processor separate from the main processor and a wireless network circuit of the power sensitive device.

8. The method of claim 1, wherein the alternative processing resource is inside a wireless network circuit of the power sensitive device.

9. The method of claim 1, wherein the alternative processing resource is a secondary processor inside a processor apparatus that also houses the main processor.

10. The method of claim 1, wherein the packet-based network traffic is offloaded to the alternative processing resource so that the main processor need not wake up.

11. The method of claim 10, wherein the packet-based network traffic to be processed is a multicast, a broadcast.

12. The method of claim 10, wherein the packet-based network traffic to be processed is discovery related traffic.

13. The method of claim 12, wherein the discovery related traffic is resulted from one or more of protocols including: Universal Plug and Play; Bonjour; Multicast Domain Name System (MONS); or Discovery And Launch (DIAL).

14. The method of claim 10, wherein the packet-based network traffic to be processed is one or more of: traffic from Dynamic Host Configuration Protocol (DHCP) or Address Resolution Protocol (ARP), keep alive messages, or a status report.

15. The method of claim 10, wherein the packet-based network traffic to be processed is a layer 3 traffic or a layer 4 traffic.

16. The method of claim 10, wherein the packet-based network traffic to be processed is a traffic that is layer 3 and/or above.

17. The method of claim 1, wherein the alternative processing resource comprises an ARM processor core.

18. The method of claim 1, wherein the power sensitive device comprises an Internet Protocol (IP) camera.

19. The method of claim 1, wherein steps recited are performed by the power sensitive device.

20. The method of claim 1, wherein steps recited are performed by the wireless access point of the WLAN system.

21. The method of claim 1, wherein steps recited are performed by a remote server coupled to the WLAN system.

22. The method of claim 1, further comprising:
adopting modified IEEE 802.11 standards such that a dependency on beacon reception for maintaining a connection with the power sensitive device becomes reduced or removed.

23. The method of claim 1, further comprising:
employing a compressed Internet Protocol (IP) header for communication between the power sensitive device and the wireless access point.

24. The method of claim 1, further comprising:
employing, by the wireless access point, an unscheduled beacon reception mechanism that causes the power sensitive device to wake up on an as-needed basis to receive a beacon.

25. The method of claim 1, further comprising:
dynamically adjusting a size of packet aggregation based on a current power state of the power sensitive device and/or a characteristic of current network traffic with the power sensitive device.

26. The method of claim 1, further comprising:
employing, by the wireless access point, a synchronization mechanism before communicating with the power sensitive device, wherein the synchronization mechanism is characterized at least by offloading a portion of processing tasks associated with synchronization from the power sensitive device to the wireless access point.

* * * * *